US012544417B2

(12) United States Patent
Lyuh et al.

(10) Patent No.: US 12,544,417 B2
(45) Date of Patent: Feb. 10, 2026

(54) ORAL FILM AND STICK JELLY FOR IMPROVING ABSORPTION IN THE ORAL MUCOSA, ANTIOXIDANT ACTIVITY, ANTI-INFLAMMATORY ACTIVITY, AND LIVER FUNCTION OF HUMANS AND COMPANION ANIMALS

(71) Applicants: ESTHER FORMULA CO., LTD., Seoul (KR); BIO360 CO., LTD, Cheonan-si (KR)

(72) Inventors: Esther Lyuh, Seoul (KR); Kun Se Kim, Seoul (KR); Eun Soo Suh, Seoul (KR); Byoung Hag Kim, Cheonan-si (KR); Mi Young An, Cheonan-si (KR); Jae Hun Kim, Cheonan-si (KR); Young Jae Park, Cheonan-si (KR); Byeong Hyeon Kim, Cheonan-si (KR); Hyo Seon Choi, Cheonan-si (KR)

(73) Assignees: ESTHER FORMULA CO., LTD., Seoul (KR); BIO360 CO., LTD, Cheonan-si (KR)

( * ) Notice: Subject to any disclaimer, the term of this patent is extended or adjusted under 35 U.S.C. 154(b) by 791 days.

(21) Appl. No.: 17/769,051

(22) PCT Filed: Feb. 17, 2022

(86) PCT No.: PCT/KR2022/002368

§ 371 (c)(1), (2) Date: Apr. 14, 2022

(87) PCT Pub. No.: WO2023/157990

PCT Pub. Date: Aug. 24, 2023

(65) Prior Publication Data

US 2024/0115641 A1 Apr. 11, 2024

(51) Int. Cl.

| | |
|---|---|
| *A61K 36/28* | (2006.01) |
| *A61K 9/00* | (2006.01) |
| *A61K 31/198* | (2006.01) |
| *A61K 31/352* | (2006.01) |
| *A61K 31/375* | (2006.01) |

(Continued)

(52) U.S. Cl.

CPC ............ *A61K 36/28* (2013.01); *A61K 9/0056* (2013.01); *A61K 9/006* (2013.01); *A61K 31/198* (2013.01); *A61K 31/352* (2013.01); *A61K 31/375* (2013.01); *A61K 38/063* (2013.01); *A61P 1/16* (2018.01); *A61P 29/00* (2018.01)

(58) Field of Classification Search

None

See application file for complete search history.

(56) References Cited

FOREIGN PATENT DOCUMENTS

JP 06078713 A * 3/1994 ............... A23L 1/28
JP 2002080388 A * 3/2002 ............ A61K 35/78

(Continued)

*Primary Examiner* — Lakshmi S Channavajjala

(74) *Attorney, Agent, or Firm* — Sughrue Mion, PLLC

(57) ABSTRACT

Disclosed are an oral film and stick jelly containing glutathione and a milk thistle extract. Provided are an oral disintegrating film, an oral mucosal adhesive film, and a stick jelly that contain glutathione, a milk thistle extract, or the like as an active ingredient, and thus are highly efficacious in improving absorption in the oral mucosa, antioxidant activity, and anti-inflammatory activity, strengthening immunity, and enhancing liver function of humans and companion animals.

2 Claims, 10 Drawing Sheets

Specification includes a Sequence Listing.

Glutathione absorption

80%
70%
60%
50%
40%
30%
20%
10%
0%

49%
18%
4%
1%
71%

T10(medium) T20(medium) T30(medium) Tissue Total absorption

(51) Int. Cl.

| | |
|---|---|
| ***A61K 38/06*** | (2006.01) |
| ***A61P 1/16*** | (2006.01) |
| ***A61P 29/00*** | (2006.01) |

(56) References Cited

FOREIGN PATENT DOCUMENTS

| | | | | | |
|---|---|---|---|---|---|
| KR | 10-2008-0035912 | A | | 4/2008 | |
| KR | 10-0887388 | B1 | | 3/2009 | |
| KR | 20120123860 | A | * | 11/2012 | ............ A61K 36/72 |
| KR | 10-20130015134 | | * | 10/2013 | ............ A61K 31/16 |
| KR | 10-2044515 | B1 | | 11/2019 | |
| KR | 10-2056338 | B1 | | 12/2019 | |
| KR | 10-2020-0070746 | A | | 6/2020 | |
| KR | 10-2291180 | B1 | | 8/2021 | |

* cited by examiner

FIG. 2

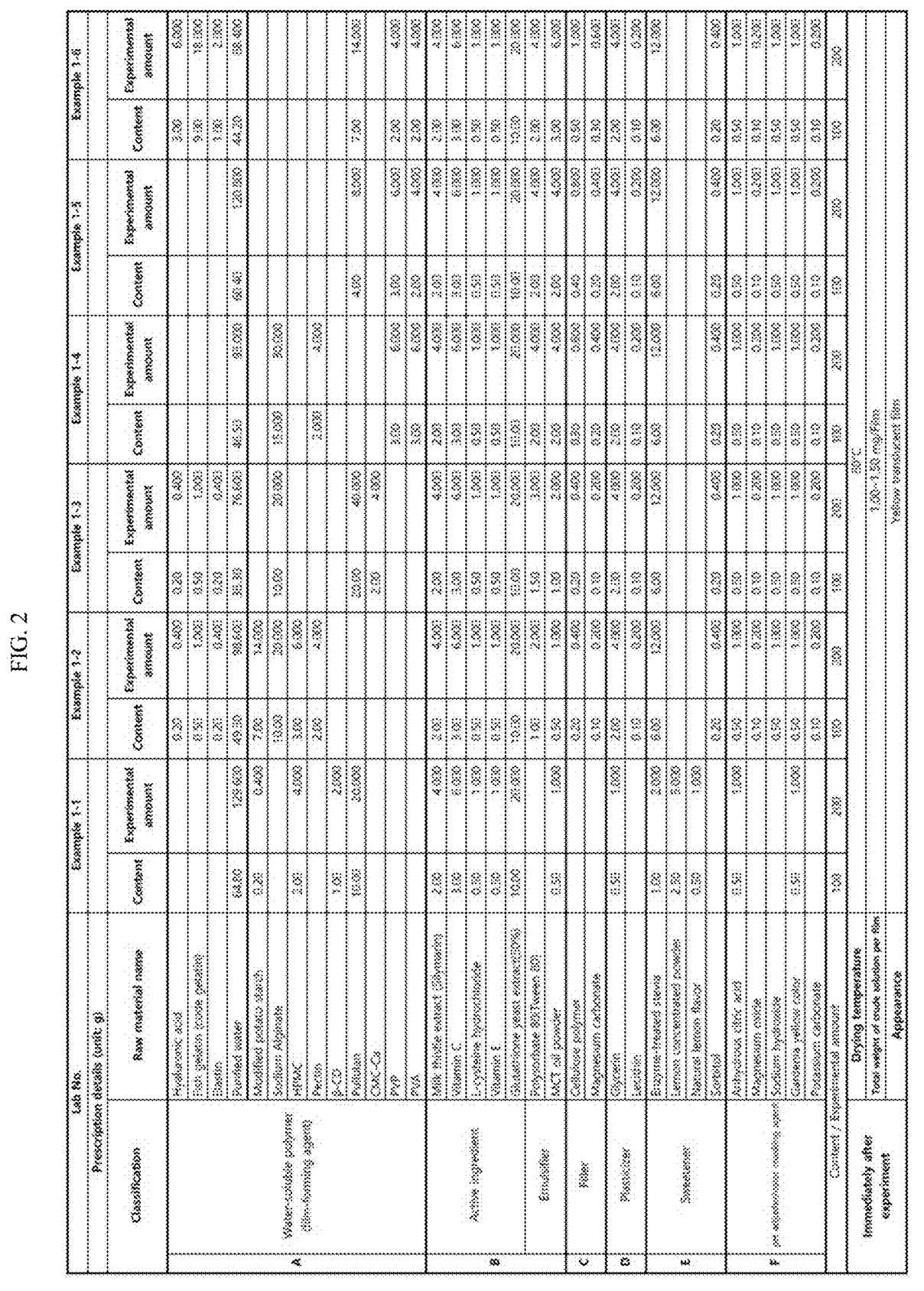

| Lab No. | | | Example 1-1 | | Example 1-2 | | Example 1-3 | | Example 1-4 | | Example 1-5 | | Example 1-6 | |
|---|---|---|---|---|---|---|---|---|---|---|---|---|---|---|
| Prescription details (unit: g) | | | | | | | | | | | | | | |
| Classification | | Raw material name | Content | Experimental amount | Content | Experimental amount | Content | Experimental amount | Content | Experimental amount | Content | Experimental amount | Content | Experimental amount |
| A | Water-soluble polymer (film-forming agent) | Hyaluronic acid | | | 0.20 | 0.400 | 0.20 | 0.400 | | | | | 3.00 | 6.000 |
| | | Fish gelatin (code gelatin) | | | 0.50 | 1.000 | 0.50 | 1.000 | | | | | 9.00 | 18.000 |
| | | Elastin | | | 0.20 | 0.400 | 0.20 | 0.400 | | | | | 1.00 | 2.000 |
| | | Purified water | 64.80 | 129.600 | 49.30 | 98.600 | 38.30 | 76.600 | 46.50 | 93.000 | 60.40 | 120.800 | 44.20 | 88.400 |
| | | Modified potato starch | 0.20 | 0.400 | 7.00 | 14.000 | | | | | | | | |
| | | Sodium Alginate | | | 10.00 | 20.000 | 10.00 | 20.000 | 15.000 | 30.000 | | | | |
| | | HPMC | 2.00 | 4.000 | 3.00 | 6.000 | | | | | | | | |
| | | Pectin | | | 2.00 | 4.000 | | | 2.000 | 4.000 | | | | |
| | | β-CD | 1.00 | 2.000 | | | | | | | | | | |
| | | Pullulan | 10.00 | 20.000 | | | 20.00 | 40.000 | | | 4.00 | 8.000 | 7.00 | 14.000 |
| | | CMC-Ca | | | | | 2.00 | 4.000 | | | | | | |
| | | PVP | | | | | | | 3.00 | 6.000 | 3.00 | 6.000 | 2.00 | 4.000 |
| | | PVA | | | | | | | 3.00 | 6.000 | 2.00 | 4.000 | 2.00 | 4.000 |
| B | Active ingredient | Milk thistle extract (Silymarin) | 2.00 | 4.000 | 2.00 | 4.000 | 2.00 | 4.000 | 2.00 | 4.000 | 2.00 | 4.000 | 2.00 | 4.000 |
| | | Vitamin C | 3.00 | 6.000 | 3.00 | 6.000 | 3.00 | 6.000 | 3.00 | 6.000 | 3.00 | 6.000 | 3.00 | 6.000 |
| | | L-cysteine hydrochloride | 0.50 | 1.000 | 0.50 | 1.000 | 0.50 | 1.000 | 0.50 | 1.000 | 0.50 | 1.000 | 0.50 | 1.000 |
| | | Vitamin E | 0.50 | 1.000 | 0.50 | 1.000 | 0.50 | 1.000 | 0.50 | 1.000 | 0.50 | 1.000 | 0.50 | 1.000 |
| | | Glutathione yeast extract(50%) | 10.00 | 20.000 | 10.00 | 20.000 | 10.00 | 20.000 | 10.00 | 20.000 | 10.00 | 20.000 | 10.00 | 20.000 |
| | Emulsifier | Polysorbate 80(Tween 80) | | | 1.00 | 2.000 | 1.50 | 3.000 | 2.00 | 4.000 | 2.00 | 4.000 | 2.00 | 4.000 |
| | | MCT oil powder | 0.50 | 1.000 | 0.50 | 1.000 | 1.00 | 2.000 | 2.00 | 4.000 | 2.00 | 4.000 | 3.00 | 6.000 |
| C | Filler | Cellulose polymer | | | 0.20 | 0.400 | 0.20 | 0.400 | 0.30 | 0.800 | 0.40 | 0.800 | 0.50 | 1.000 |
| | | Magnesium carbonate | | | 0.10 | 0.200 | 0.10 | 0.200 | 0.20 | 0.400 | 0.20 | 0.400 | 0.30 | 0.600 |
| D | Plasticizer | Glycerin | 0.50 | 1.000 | 2.00 | 4.000 | 2.00 | 4.000 | 2.00 | 4.000 | 2.00 | 4.000 | 2.00 | 4.000 |
| | | Lecithin | | | 0.10 | 0.200 | 0.10 | 0.200 | 0.10 | 0.200 | 0.10 | 0.200 | 0.10 | 0.200 |
| E | Sweetener | Enzyme-treated stevia | 1.00 | 2.000 | 6.00 | 12.000 | 6.00 | 12.000 | 6.00 | 12.000 | 6.00 | 12.000 | 6.00 | 12.000 |
| | | Lemon concentrated powder | 2.50 | 5.000 | | | | | | | | | | |
| | | Natural lemon flavor | 0.50 | 1.000 | | | | | | | | | | |
| | | Sorbitol | | | 0.20 | 0.400 | 0.20 | 0.400 | 0.20 | 0.400 | 0.20 | 0.400 | 0.20 | 0.400 |
| F | pH adjustment/masking agent | Anhydrous citric acid | 0.50 | 1.000 | 0.50 | 1.000 | 0.50 | 1.000 | 0.50 | 1.000 | 0.50 | 1.000 | 0.50 | 1.000 |
| | | Magnesium oxide | | | 0.10 | 0.200 | 0.10 | 0.200 | 0.10 | 0.200 | 0.10 | 0.200 | 0.10 | 0.200 |
| | | Sodium hydroxide | | | 0.50 | 1.000 | 0.50 | 1.000 | 0.50 | 1.000 | 0.50 | 1.000 | 0.50 | 1.000 |
| | | Gardenia yellow color | 0.50 | 1.000 | 0.50 | 1.000 | 0.50 | 1.000 | 0.50 | 1.000 | 0.50 | 1.000 | 0.50 | 1.000 |
| | | Potassium carbonate | | | 0.10 | 0.200 | 0.10 | 0.200 | 0.10 | 0.200 | 0.10 | 0.200 | 0.10 | 0.200 |
| Content / Experimental amount | | | 100 | 200 | 100 | 200 | 100 | 200 | 100 | 200 | 100 | 200 | 100 | 200 |
| Immediately after experiment | | Drying temperature | 80°C | | | | | | | | | | | |
| | | Total weight of crude solution per film | 1.00~1.50 mg/Film | | | | | | | | | | | |
| | | Appearance | Yellow translucent film | | | | | | | | | | | |

FIG. 4

| LAB No. | | | | Example 3-1 | | Example 3-2 | | Example 3-3 | | Example 3-4 | | Example 3-5 | | Example 3-6 | |
|---|---|---|---|---|---|---|---|---|---|---|---|---|---|---|---|
| Prescription details (unit: g) | | | | | | | | | | | | | | | |
| Classification | | | Raw material name | Content | Experimental amount | Content | Experimental amount | Content | Experimental amount | Content | Experimental amount | Content | Experimental amount | Content | Experimental amount |
| Mucosal (adhesive) layer | A | Active ingredient | Milk thistle extract (Silymarin) | 2.00 | 4.000 | 2.00 | 4.000 | 2.00 | 4.000 | 2.00 | 4.000 | 2.00 | 4.000 | 2.00 | 4.000 |
| | | | Vitamin C | 3.00 | 6.000 | 3.00 | 6.000 | 3.00 | 6.000 | 3.00 | 6.000 | 3.00 | 6.000 | 3.00 | 6.000 |
| | | | L-cysteine hydrochloride | 0.50 | 1.000 | 0.50 | 1.000 | 0.50 | 1.000 | 0.50 | 1.000 | 0.50 | 1.000 | 0.50 | 1.000 |
| | | | Vitamin E | 0.50 | 1.000 | 0.50 | 1.000 | 0.50 | 1.000 | 0.50 | 1.000 | 0.50 | 1.000 | 0.50 | 1.000 |
| | | | Glutathione yeast extract(50%) | 9.00 | 18.000 | 9.00 | 18.000 | 9.00 | 18.000 | 9.00 | 18.000 | 9.00 | 18.000 | 9.00 | 18.000 |
| | | Emulsifier | Polysorbate 80(Tween 80) | | | 1.00 | 2.000 | 1.50 | 3.000 | 2.00 | 4.000 | 2.00 | 4.000 | 2.00 | 4.000 |
| | | | MCT oil powder | 0.50 | 1.000 | 0.50 | 1.000 | 1.00 | 2.000 | 2.00 | 4.000 | 2.00 | 4.000 | 3.00 | 6.000 |
| | B | Water-soluble polymer (film-forming agent) | Hyaluronic acid | | | 0.20 | 0.400 | 0.20 | 0.400 | 0.20 | 0.400 | 0.20 | 0.400 | 3.00 | 6.000 |
| | | | Fish gelatin (code gelatin) | | | 0.50 | 1.000 | 0.50 | 1.000 | 0.50 | 1.000 | 0.50 | 1.000 | 9.00 | 18.000 |
| | | | Elastin | | | 0.20 | 0.400 | 0.20 | 0.400 | 0.20 | 0.400 | 0.20 | 0.400 | 1.00 | 2.000 |
| | | | Purified water | 64.80 | 129.600 | 48.30 | 96.600 | 48.30 | 96.600 | 45.60 | 91.200 | 54.50 | 109.000 | 38.20 | 76.400 |
| Support (protection) layer | C | Water-soluble polymer (film-forming agent) | Modified potato starch | 0.20 | 0.400 | 4.00 | 8.000 | | | | | | | | |
| | | | Sodium Alginate | | | 5.00 | 10.000 | 5.00 | 10.000 | 12.00 | 24.000 | | | | |
| | | | HPMC | 2.00 | 4.000 | 2.00 | 4.000 | | | | | | | | |
| | | | Pectin | | | 2.00 | 4.000 | | | 2.000 | 4.000 | | | | |
| | | | β-CD | 1.00 | 2.000 | | | | | | | | | | |
| | | | Pullulan | 10.00 | 20.000 | | | 10.00 | 20.000 | | | 4.00 | 8.000 | 7.00 | 14.000 |
| | | | CMC-Ca | | | | | 4.00 | 8.000 | | | | | | |
| | | | PVP | | | | | | | 3.00 | 6.000 | 4.00 | 8.000 | 5.00 | 10.000 |
| | | | PVA | | | | | | | 3.00 | 6.000 | 3.00 | 6.000 | 2.00 | 4.000 |
| | D | Active ingredient | Milk thistle extract (Silymarin) | | | | | | | | | | | | |
| | | | Glutathione yeast extract(50%) | 1.00 | 2.000 | 10.00 | 20.000 | 1.00 | 2.000 | 1.00 | 2.000 | 1.00 | 2.000 | 1.00 | 2.000 |
| | E | Filler | Cellulose polymer | | | 0.20 | 0.400 | 0.20 | 0.400 | 0.30 | 0.600 | 0.40 | 0.800 | 0.50 | 1.000 |
| | | | Magnesium carbonate | | | 0.10 | 0.200 | 0.10 | 0.200 | 0.20 | 0.400 | 0.20 | 0.400 | 0.30 | 0.600 |
| | F | Plasticizer | Glycerin | 0.50 | 1.000 | 2.00 | 4.000 | 2.00 | 4.000 | 2.00 | 4.000 | 2.00 | 4.000 | 2.00 | 4.000 |
| | | | Lecithin | | | 0.10 | 0.200 | 0.10 | 0.200 | 0.10 | 0.200 | 0.10 | 0.200 | 0.10 | 0.200 |
| | G | Sweetener | Enzyme-treated stevia | 1.00 | 2.000 | 6.00 | 12.000 | 6.00 | 12.000 | 6.00 | 12.000 | 6.00 | 12.000 | 6.00 | 12.000 |
| | | | Lemon concentrated powder | 2.50 | 5.000 | 2.50 | 5.000 | 2.50 | 5.000 | 2.50 | 5.000 | 2.50 | 5.000 | 2.50 | 5.000 |
| | | | Natural lemon flavor | 0.50 | 1.000 | 0.50 | 1.000 | 0.50 | 1.000 | 0.50 | 1.000 | 0.50 | 1.000 | 0.50 | 1.000 |
| | | | Sorbitol | | | 0.20 | 0.400 | 0.20 | 0.400 | 0.20 | 0.400 | 0.20 | 0.400 | 0.20 | 0.400 |
| | H | pH adjuster / color-masking agent | Anhydrous citric acid | 0.50 | 1.000 | 0.50 | 1.000 | 0.50 | 1.000 | 0.50 | 1.000 | 0.50 | 1.000 | 0.50 | 1.000 |
| | | | Magnesium oxide | | | 0.10 | 0.200 | 0.10 | 0.200 | 0.10 | 0.200 | 0.10 | 0.200 | 0.10 | 0.200 |
| | | | Sodium hydroxide | | | 0.50 | 1.000 | 0.50 | 1.000 | 0.50 | 1.000 | 0.50 | 1.000 | 0.50 | 1.000 |
| | | | Gardenia yellow color | 0.50 | 1.000 | 0.50 | 1.000 | 0.50 | 1.000 | 0.50 | 1.000 | 0.50 | 1.000 | 0.50 | 1.000 |
| | | | Potassium carbonate | | | 0.10 | 0.200 | 0.10 | 0.200 | 0.10 | 0.200 | 0.10 | 0.200 | 0.10 | 0.200 |
| Content / Experimental amount | | | | 100 | 200 | 100 | 200 | 100 | 200 | 100 | 200 | 100 | 200 | 100 | 200 |
| | | | Drying temperature | 80°C | | | | | | | | | | | |
| | | | Total weight of crude solution per film | 1.00~1.50 mg/film | | | | | | | | | | | |
| | | | Appearance | Yellow translucent film | | | | | | | | | | | |

FIG. 5
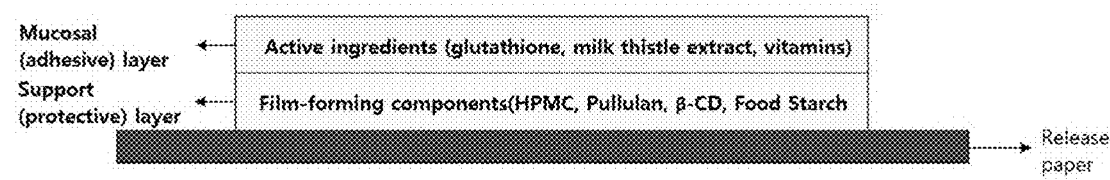
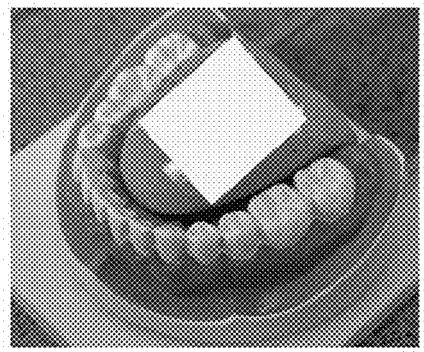
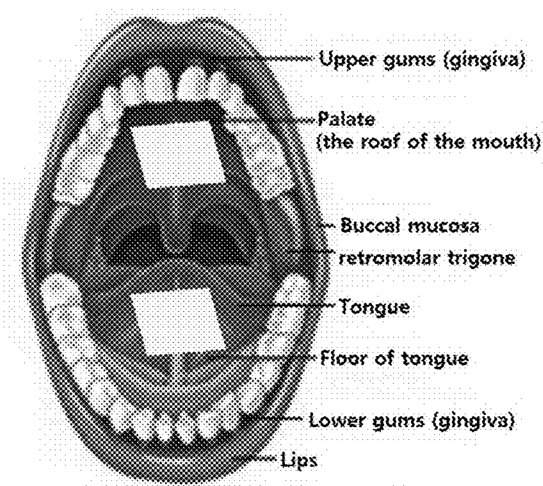

FIG. 6

| Lab No. | | | Example 4-1 | | Example 4-2 | | Example 4-3 | | Example 4-4 | | Example 4-5 | | Example 4-6 | |
|---|---|---|---|---|---|---|---|---|---|---|---|---|---|---|
| Prescription details (unit: g) | | | | | | | | | | | | | | |
| | Classification | Raw material name | Content | Experimental amount | Content | Experimental amount | Content | Experimental amount | Content | Experimental amount | Content | Experimental amount | Content | Experimental amount |
| A | Sugar-gelling agent composition | Modified potato starch | 7.00 | 14.000 | | | | | | | | | | |
| | | Sodium Alginate | 5.00 | 10.000 | 10.00 | 20.000 | 10.00 | 20.000 | | | | | | |
| | | HPMC | | | 5.00 | 10.000 | | | 5.00 | 10.000 | | | | |
| | | Pectin | | | 2.00 | 4.000 | 3.00 | 6.000 | | | | | | |
| | | β-CD | 1.00 | 2.000 | | | | | | | | | | |
| | | Pullulan | | | | | 5.00 | 10.000 | 5.00 | 10.000 | | | 5.00 | 10.000 |
| | | CMC-Ca | | | | | | | | | 7.00 | 14.000 | 2.00 | 4.000 |
| | | oligosaccharide | 2.00 | 4.000 | 2.00 | 4.000 | 2.00 | 4.000 | 2.00 | 4.000 | 2.00 | 4.000 | 2.00 | 4.000 |
| | Food Gel NS-K Korea Carragheen Co., Ltd. | Xanthan gum | 10.00 | 20.000 | 9.00 | 18.000 | 8.00 | 16.000 | 7.00 | 14.000 | 6.00 | 12.000 | 5.00 | 10.000 |
| | | Locust bean gum | | | | | | | | | | | | |
| | | Agar | | | | | | | | | | | | |
| | | Carrageenan | | | | | | | | | | | | |
| | Active ingredient | Milk thistle extract (Silymarin) | 0.03 | 0.060 | 0.50 | 1.000 | 1.00 | 2.000 | 2.00 | 4.000 | 3.00 | 6.000 | 4.00 | 8.000 |
| | | Glutathione yeast extract(50%) | 30.00 | 60.000 | 33.00 | 66.000 | 31.00 | 62.000 | 30.00 | 60.000 | 27.00 | 54.000 | 26.00 | 52.000 |
| | Emulsifier | Polysorbate 80(Tween 80) | | | 0.10 | 0.200 | 0.20 | 0.400 | 0.30 | 0.600 | 0.40 | 0.800 | 0.50 | 1.000 |
| B | Water-soluble polymer (film-forming agent) | Hyaluronic acid | 3.26 | 6.520 | 3.26 | 6.520 | 3.26 | 6.520 | 3.26 | 6.520 | 3.26 | 6.520 | 3.26 | 6.520 |
| | | Fish gelatin (code gelatin) | 9.78 | 19.560 | 9.78 | 19.560 | 9.78 | 19.560 | 9.78 | 19.560 | 9.78 | 19.560 | 9.78 | 19.560 |
| | | Elastin | 0.65 | 1.300 | 0.65 | 1.300 | 0.65 | 1.300 | 0.65 | 1.300 | 0.65 | 1.300 | 0.65 | 1.300 |
| | | Purified water | 16.28 | 32.560 | 9.71 | 19.420 | 11.11 | 22.220 | 20.01 | 40.020 | 25.91 | 51.820 | 26.81 | 53.620 |
| C | Active ingredient | Vitamin C | 1.00 | 2.000 | 1.00 | 2.000 | 1.00 | 2.000 | 1.00 | 2.000 | 1.00 | 2.000 | 1.00 | 2.000 |
| | | Fruit concentrate | 10.00 | 20.000 | 10.00 | 20.000 | 10.00 | 20.000 | 10.00 | 20.000 | 10.00 | 20.000 | 10.00 | 20.000 |
| D | Plasticizer | Glycerin | 2.00 | 4.000 | 2.00 | 4.000 | 2.00 | 4.000 | 2.00 | 4.000 | 2.00 | 4.000 | 2.00 | 4.000 |
| | | Lecithin | 0.10 | 0.200 | 0.10 | 0.200 | 0.10 | 0.200 | 0.10 | 0.200 | 0.10 | 0.200 | 0.10 | 0.200 |
| E | Sweetener | Enzyme-treated stevia | 0.50 | 1.000 | 0.50 | 1.000 | 0.50 | 1.000 | 0.50 | 1.000 | 0.50 | 1.000 | 0.50 | 1.000 |
| | | Sorbitol | 0.20 | 0.400 | 0.20 | 0.400 | 0.20 | 0.400 | 0.20 | 0.400 | 0.20 | 0.400 | 0.20 | 0.400 |
| F | pH adjuster | Anhydrous citric acid | 0.50 | 1.000 | 0.50 | 1.000 | 0.50 | 1.000 | 0.50 | 1.000 | 0.50 | 1.000 | 0.50 | 1.000 |
| | | Magnesium oxide | 0.10 | 0.200 | 0.10 | 0.200 | 0.10 | 0.200 | 0.10 | 0.200 | 0.10 | 0.200 | 0.10 | 0.200 |
| | | Sodium hydroxide | 0.50 | 1.000 | 0.50 | 1.000 | 0.50 | 1.000 | 0.50 | 1.000 | 0.50 | 1.000 | 0.50 | 1.000 |
| | | Potassium carbonate | 0.10 | 0.200 | 0.10 | 0.200 | 0.10 | 0.200 | 0.10 | 0.300 | 0.10 | 0.200 | 0.10 | 0.200 |
| Content / Experimental amount | | | 100 | 200 | 100 | 200 | 100 | 200 | 100 | 200 | 100 | 200 | 100 | 200 |
| | | Drying temperature | 80°C | | | | | | | | | | | |
| | | Total weight of crude solution per film | 1.00~1.50 mg/Film | | | | | | | | | | | |
| | | Appearance | Yellow translucent jelly | | | | | | | | | | | |

FIG. 10
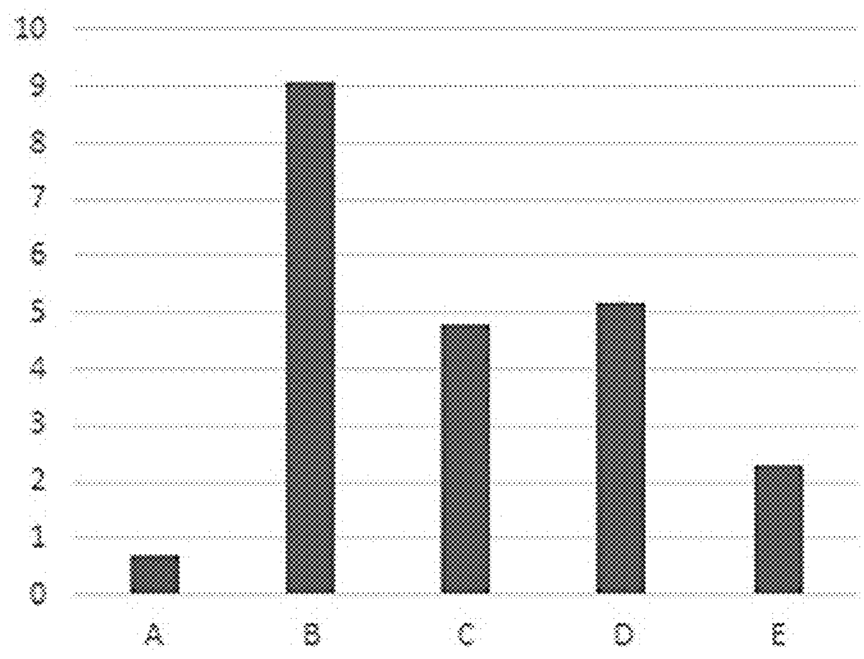
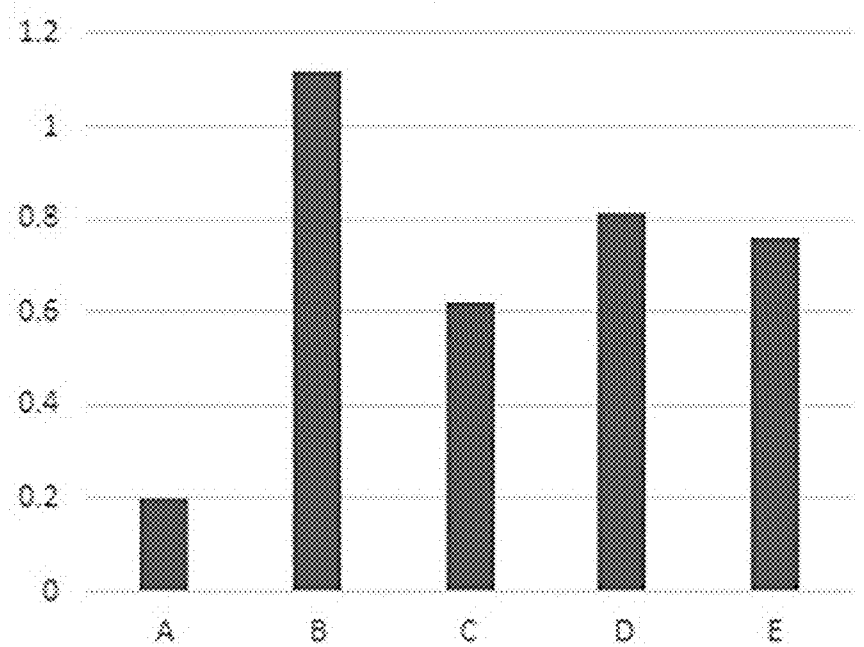

ORAL FILM AND STICK JELLY FOR IMPROVING ABSORPTION IN THE ORAL MUCOSA, ANTIOXIDANT ACTIVITY, ANTI-INFLAMMATORY ACTIVITY, AND LIVER FUNCTION OF HUMANS AND COMPANION ANIMALS

CROSS REFERENCE TO RELATED APPLICATIONS

This application is a National Stage of International Application No. PCT/KR2022/002368 filed Feb. 17, 2022.

TECHNICAL FIELD

The present invention relates to an oral film and stick jelly for improving absorption in the oral mucosa, antioxidant activity, anti-inflammatory activity, and liver function of humans and companion animals. More specifically, the present invention relates to an oral film and stick jelly that contain glutathione and other active ingredients, and thus are efficacious in improving absorption in the oral mucosa, antioxidant activity, anti-inflammatory activity, and liver function of humans and companion animals.

BACKGROUND ART

Coronary artery occlusion, hypertensive heart diseases and stroke, arterial hypertension, myocardial infarction, cerebrovascular diseases, heart failure, rheumatic heart diseases, congenital heart diseases and myocardial diseases cause high mortality and morbidity in thousands of patients worldwide. The incidence of these diseases increases with the increasing age of the population. Moreover, these diseases are accompanied by various comorbidities (overweight, obesity, diabetes, etc.) which aggravate the symptoms of patents. The incidence and development of these diseases are closely associated with metabolic changes that generate a state of oxidative stress due to excessive production of reactive oxygen species (ROS) and reactive nitrogen species (RNS). Research showed that the deficiency of antioxidant molecules in older humans is due to a marked decrease in synthesis. Therefore, a diet rich in cysteine and glycine, which are precursors of glutathione, completely restores glutathione cell synthesis and glutathione (L-glutamyl-L-cysteinylglycine) concentrations, and reduces oxidative stress levels to prevent oxidative stress and age-related damage.

Glutathione was isolated from yeast by Hopkins in 1929 and is a physiologically active substance, the biochemical mechanisms of which are being studied very actively. Glutathione is a tripeptide composed of three amino acids, namely glutamate, cysteine, and glycine, is present at a concentration of 0.1 to 10 mM in the cells of animals, plants and microorganisms, and accounts for 90% or more of the total non-proteinaceous sulfur component of cells. Glutathione is mostly present in a reduced form (GSH) and is present in a small amount as a GSS-protein (PrSSG), which is a combination of an oxidized form (GSSG) and disulfide, and a glutathione reductase (GR). The reduced glutathione (GSH) is a low-molecular-weight thiol-containing peptide present in most living cells, including bacteria and mammals.

Recent research shows that glutathione plays a fundamental role in cellular homeostasis, causes changes in the GSH/GSSG ratio and concentration, and is used in the evaluation and diagnosis of various redox-related pathologies such as cancer, degenerative brain diseases, stroke, and cardiovascular diseases. Moreover, glutathione has emerged as a potential candidate that promotes penetration of the blood-brain barrier. In addition, glutathione, which is also called vitamin G, is reported to act as an antioxidant and to have various efficacies of reducing oxidative stress, improving immunity, detoxification, activating enzymes, reducing body fat, skin whitening and the like. Therefore, it is necessary to devise a novel technology that makes it possible to effectively absorb glutathione and that exhibits additional functionality when used along with other ingredients.

Meanwhile, silymarin is a substance extracted from the fruits of *Silybum marianum* and is called "milk thistle" in Europe. It has been identified that milk thistle is composed of ingredients such as silybin, isosilybin, silychristin, silydianin, silandrin, and silyhermin. Silymarin is a mixture of silybin, isosilybin, silychristin, and silydianin, which accounts for 70% of a Cardui Mariani Fructus extract. Silymarin is reported to be effective in regenerating and protecting hepatocytes, lowering cholesterol, and enhancing immunity. Silymarin has been used in medicine for over 2,000 years, and has been used as a therapeutic agent for liver and gallbladder diseases, including hepatitis, cirrhosis, and jaundice, and as a therapeutic agent for a variety of acute and chronic liver diseases. Despite the wide range of pharmacological properties, the use of silymarin is limited because silymarin has low water solubility and thus has low bioavailability of 23 to 47% when administered orally. It is necessary to increase dispersion stability in order to improve the solubility of silymarin.

Meanwhile, oral administration is very advantageous in delivering useful drug ingredients beyond what is acceptable to consumers. Oral administration of drugs has advantages of being easier and more convenient to users than administration via other routes, but has disadvantages in that nutrients and functional ingredients may be decomposed and denatured and absorption thereof may be extremely low when the drug is released into the body. Accordingly, in a novel attempt to solve this problem, an oral disintegrating film (orodispersible film; ODF) has been proposed. The oral disintegrating film is small and thin, and is a formulation administered in a manner of being placed on the tongue and is similar to a conventional oral disintegrating tablet (ODT), which is administered by being disintegrated in the mouth. In particular, the oral disintegrating film is an oral drug delivery system that can be effectively administered even to patients who have difficulty chewing or swallowing, and has emerged as an effective drug delivery system owing to advantages of being convenient to administer and carry, increasing the in-vivo absorption rate of nutrients and raw materials and ingredients having useful functions in the human body, and enabling rapid action and expression.

However, conventional oral disintegrating films must be small in size so that they can be easily administered, and must be thin so that they can rapidly disintegrate in the mouth, thus disadvantageously making it impossible to manufacture the same having a weight beyond a certain level. In addition, conventional oral disintegrating films must contain a polymer in a predetermined amount or more so as to be miscible with a drug containing an active ingredient and to maintain strength and solubility suitable for handling the film, thus having a limitation in that the content of the active ingredient is inevitably lowered. Accordingly, there is need for a novel oral film that can exhibit various functionalities while overcoming this limitation.

Meanwhile, the liver has many functions in the human body, such as metabolism of lipids, detoxification, excretion of bile, storage of various nutrients, hematopoiesis, blood coagulation, and regulation of circulating blood volume. Therefore, the liver is an essential organ because liver disorders cause deterioration in various functions of the liver and can be life-threatening in the worst cases. When the liver is stimulated by alcohol, viruses, and various harmful environmental factors, hepatic stellate cells are activated to secrete various cytokines including transforming growth factor β (TGF β). In particular, TGF β is a multifunctional cytokine known to play a key role in genesis and carcinogenesis. In the TGF β signaling system, the TGF β receptor activated by TGF β phosphorylates and activates intracellular Smad2/3 protein, binds to Smad4, and then moves into the nucleus, thereby causing transcription of several related genes. Antioxidants facilitate the physiological activity of the liver.

Antioxidants protect the human body by detoxifying reactive oxygen species (ROS). It is known that unless antioxidants properly remove reactive oxygen species (ROS), the accumulated reactive oxygen species (ROS) may cause various diseases or aging. Antioxidants may be divided into antioxidants naturally present in the human body and externally administered antioxidants. Antioxidants naturally present in the human body include enzymes such as SOD, glutathione and peroxidase, uric acid, and bilirubin. Externally administered antioxidants include vitamins E and C and beta-carotene. Selenium is a representative mineral. In addition, hormones such as melatonin, and phenols and flavonoids rich in natural products and the like are representative antioxidants. Therefore, selection of effective antioxidants can contribute to an improvement in liver function.

Meanwhile, the inflammatory response in humans and animals is one of the immune system responses of biological tissues to external physical factors such as mechanical injury, temperature, and radiation, chemical factors such as poisons including strong acids, and immunological stimuli such as pathogenic microorganisms and allergies, and is a mechanism to repair or regenerate damaged tissue. In the in-vivo tissue regeneration mechanism, macrophages play a very important role in regulating the inflammatory response and immune function. Macrophages activated by external antigens and stimuli secrete large amounts of growth factors, cytokines, prostaglandin E2 (PGE2), lipid mediators, and nitric oxide. Among them, PGE2 dilates blood vessels, increases the permeability of blood vessel walls, allows immune cells to gather at the site of inflammation, and promotes the secretion of inflammatory cytokines such as interleukin-6. Also, when microorganisms invade, macrophages emit reactive oxygen intermediates, hypochlorite, nitric oxide, myeloperoxidase, neutral protease, lysosomal hydroxylase, and the like, which are toxic to invading microorganisms, to the microorganisms or produce the same. These molecules also directly damage the tissue of subjects. Such inflammatory responses are divided on a temporal basis into acute and chronic inflammatory responses, and have the risk of causing boils, sores, stomatitis, peritonitis, inflammatory bowel disease, gastric ulcers, cystitis, tonsillitis, conjunctivitis, arthritis, and the like, depending on the cause of occurrence of the disease, the site of occurrence of the disease, and the pattern of inflammation.

Meanwhile, jelly is a food obtained by coagulating a mixture of a semi-solidifying agent (gum-forming agent) such as pectin, gelatin, agar, starch, and alginic acid, with sugar, acidulant, and fruit juice, to an extent to realize sufficient hardness to maintain a soft shape. Jelly is mainly used as a snack or dessert after a meal because it tastes sweet due to sugar, and is attractive to all ages due to the soft texture thereof and easy-to-chew and easy-to-swallow properties. Accordingly, there is a trend toward increased development of jelly imparted with improved functionality and/or sensation by adding various materials.

DISCLOSURE

Technical Problem

It is an object of the present invention to provide a food composition that is highly efficacious in improving antioxidant activity and anti-inflammatory activity, strengthening immunity, and enhancing liver function by selecting ingredients that are highly effective in improving antioxidant activity and anti-inflammatory activity, strengthening immunity, and enhancing liver function, and an oral film and a stick jelly that greatly increase in-vivo absorption thereof through the oral mucosa in order to provide the food composition.

Technical Solution

In accordance with one aspect of the present invention, the above and other objects can be accomplished by the provision of an oral film containing glutathione and a milk thistle extract.

Preferably, the oral film is any one selected from an oral disintegrating film and an oral mucosal adhesive film.

Preferably, the oral film further contains at least one selected from vitamin C, L-cysteine hydrochloride, and vitamin E.

Preferably, the oral film further contains at least one water-soluble polymer selected from modified potato starch, hydroxypropyl methylcellulose, β-cyclodextrin (β-CD), and pullulan.

Preferably, the oral film is used to provide antioxidant activity, to provide anti-inflammatory activity, or improve liver function.

In accordance with another aspect of the present invention, provided is a stick jelly containing glutathione and a milk thistle extract.

Preferably, the stick jelly further contains vitamin C, or a fruit concentrate.

Preferably, the stick jelly further contains at least one water-soluble polymer selected from hyaluronic acid, fish gelatin, elastin, modified potato starch, β-cyclodextrin (β-CD), sodium alginate, xanthan gum, locust bean gum, agar, and carrageenan.

Preferably, the stick jelly is used to provide antioxidant activity, to provide anti-inflammatory activity, or to improve liver function.

Advantageous Effects

The present invention provides an oral disintegrating film, an oral mucosal adhesive film, and a stick jelly containing glutathione, a milk thistle extract, or the like as an active ingredient, thereby being highly efficacious in improving absorption in the oral mucosa, antioxidant activity and anti-inflammatory activity, strengthening immunity, and enhancing liver function of humans and companion animals.

DESCRIPTION OF DRAWINGS

FIG. 2 is a table showing the composition of the oral disintegrating film of the present invention.

FIG. 4 is a table illustrating the ingredients constituting the oral mucosal adhesive film of the present invention.

FIG. 5 is a diagram showing the structure of the oral mucosal adhesive film of the present invention and the position of the oral mucosa at which the oral mucosal adhesive film is attached.

FIG. 6 is a table showing the ingredients constituting the stick jelly of the present invention.

FIG. 10 is a graph illustrating (A) the mRNA expression level of collagen-$\alpha$(I), and (B) the mRNA expression level of $\alpha$-SMA to identify the ability to improve liver function of the oral disintegrating film, the oral mucosal adhesive film, and the stick jelly according to the present invention.

BEST MODE

Figure 1:
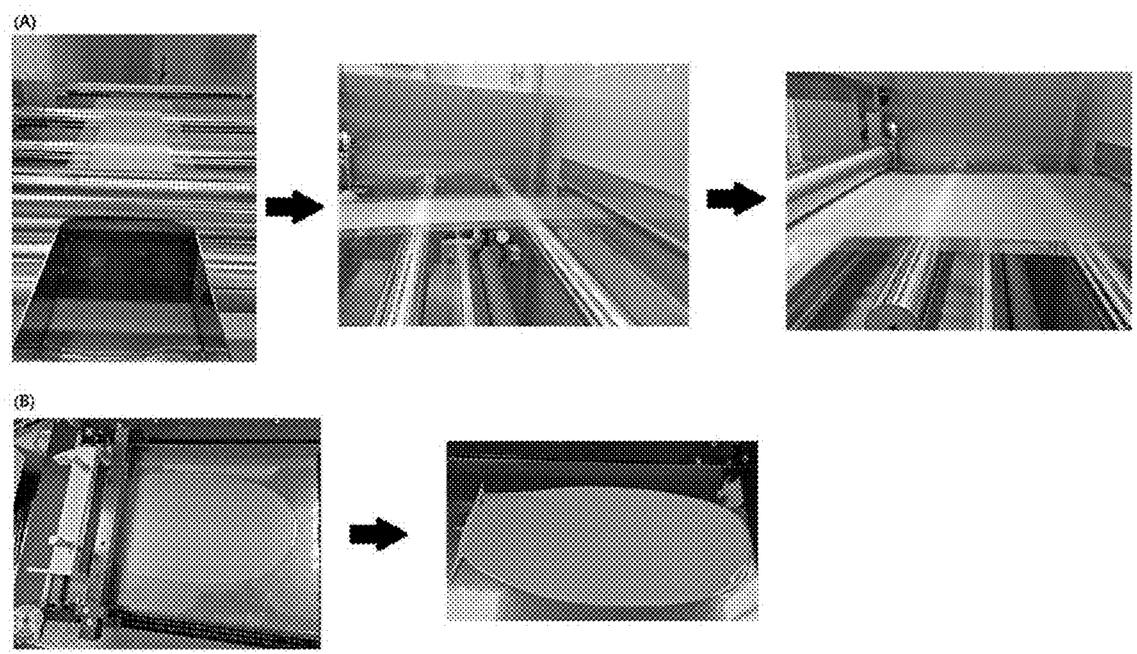
FIG. 1 is an image illustrating an example of production of an oral film (oral disintegrating film or oral mucosal adhesive film) according to the present invention, wherein (A) shows production of an oral film in the laboratory, and (B) shows production of an oral film in an actual production facility.

The present invention provides a food composition that is highly efficacious in improving antioxidant activity and anti-inflammatory activity, strengthening immunity, and enhancing liver function by selecting ingredients that are highly effective in improving antioxidant activity and anti-inflammatory activity, strengthening immunity, and enhancing liver function.

Accordingly, the present invention provides an oral film containing glutathione and a milk thistle extract. In addition, the present invention provides a stick jelly containing glutathione and a milk thistle extract.

Glutathione (L-glutamyl-L-cysteinylglycine) plays a fundamental role in cellular homeostasis, causes changes in the GSH/GSSG ratio and concentration, and is used in the evaluation and diagnosis of various redox-related pathologies such as cancer, degenerative brain diseases, stroke, and cardiovascular diseases. Moreover, glutathione has emerged as a potential candidate that promotes penetration of the blood-brain barrier. In addition, glutathione, which is also called vitamin G, is reported to act as an antioxidant and to have various efficacies of reducing oxidative stress, improving immunity, detoxification, activating enzymes, reducing body fat, skin whitening, and the like. Therefore, the present invention provides a composition that can effectively absorb glutathione and exhibit additional functionality when used along with other ingredients, for example, an oral film and a stick jelly. In the present invention, preferably, a glutathione yeast extract (containing 50% glutathione) extracted from yeast containing a great amount of glutathione was used.

Meanwhile, preferably, the oral film of the present invention may further contain a milk thistle extract as an additional active ingredient. The milk thistle extract is known to be mostly composed of silymarin as a potent antioxidant and to be efficacious in protection from liver toxicity and improving the ability of the liver to regenerate. However, silymarin has a drawback of low bioavailability upon oral administration due to the low solubility thereof in water. Therefore, it is necessary to increase dispersion stability in order to improve the solubility of silymarin. Accordingly, in the present invention, it is possible to prepare a composition that has high dispersion stability of each component and excellent formulation stability by using a combination of glutathione with a milk thistle extract (silymarin). The silymarin extract according to the present invention may be used without limitation, as long as it is obtained using an extraction method known in the art.

Meanwhile, in the oral film of the present invention, the additional active ingredient preferably includes any one or more selected from vitamin C, L-cysteine hydrochloride, and vitamin E. More preferably, the additional active ingredient consists of 8 to 11 parts by weight of glutathione, 1 to 3 parts by weight of a milk thistle extract, 2 to 4 parts by weight of vitamin C, 0.4 to 0.6 parts by weight of L-cysteine hydrochloride, and 0.4 to 0.6 parts by weight of vitamin E based on 100 parts by weight of the total weight of the oral film. Based thereon, it is possible to prepare a preferred oral film formulation according to the present invention.

Meanwhile, oral administration of drugs has advantages of being easier to administer and more convenient to users than administration via other routes, but has disadvantages in that nutrients and functional ingredients may be decomposed and denatured, or absorption thereof may be extremely low when the drug is released into the body. Accordingly, in a novel attempt to solve this problem, an oral disintegrating film (orodispersible film; ODF) has been proposed. However, conventional oral disintegrating films should be small in size so that they can be easily administered and should be thin so that they can rapidly disintegrate in the mouth, thus disadvantageously making it impossible to manufacture the same having a weight beyond a certain level. In addition, conventional oral disintegrating films should contain a polymer in a predetermined amount or more so as to be miscible with a drug containing an active ingredient and to maintain strength and solubility suitable for handling the film, thus having a limitation in that the content of the active ingredient is inevitably lowered. Accordingly, in the present invention, by selecting an optimum film formulation containing a water-soluble polymer and determining the optimum composition and ratio, a film containing a sufficient amount of active ingredients and exhibiting excellent stability and high oral permeability was manufactured.

Meanwhile, the oral film of the present invention preferably includes any one selected from an oral disintegrating film and an oral mucosal adhesive film. An example of production of an oral film according to the present invention is shown in FIG. 1, wherein (A) shows production of an oral film in the laboratory, and (B) shows production of an oral film in an actual production facility.

Meanwhile, the oral film of the present invention preferably contains a water-soluble polymer (film-forming agent), an emulsifier (surfactant), a filler, a plasticizer, a sweetener, a pH adjuster/color-masking agent, a flavoring agent, a preservative, or the like. An experiment was performed on the composition while changing the content thereof to determine an optimum component ratio.

Meanwhile, preferably, in the oral film of the present invention, the water-soluble polymer (film-forming agent), for example, includes one or more water-soluble polymers selected from the group consisting of pullulan, gelatin, elastin, hyaluronic acid, pectin, low-viscosity pectin, hydroxypropyl methylcellulose (HPMC), low-viscosity hydroxypropyl methyl cellulose, hydroxyethyl cellulose, hydroxypropyl cellulose, carboxymethyl cellulose (CMC), polyvinyl alcohol (PVA), polyacrylic acid, methyl methacrylate copolymers, carboxyvinyl polymers, polyethylene glycol, alginic acid, low-viscosity alginic acid, sodium alginate, carrageenan, modified starch, casein, isolated whey protein, isolated soy protein, zein, levan, elsinan, gluten, acacia gum, carrageenan, gum arabic, guar gum, locust bean gum, xanthan gum, and agar. In the present invention, the water-soluble polymer (film-forming agent) includes, for example, at least one water-soluble polymer selected from modified potato starch, hydroxypropyl methylcellulose, β-cyclodextrin (β-CD), and pullulan. In this case, more preferably, the water-soluble polymer is present in an amount of 10 to 85% by weight based on the total weight of the oral film. In the present invention, by increasing the content of the active ingredient, i.e., glutathione, and controlling the content of water-soluble polymer (film-forming agent), i.e., HPMC, pullulan, β-cyclodextrin (β-CD), or potato modified starch, a film having excellent strength and a homogeneous surface can be produced.

Meanwhile, in the oral film of the present invention, a solvent is used for the water-soluble polymer (film-forming agent). For example, the solvent may include at least one selected from the group consisting of water (purified water), alcohol, alkyl acetate, dimethylformamide, dimethyl sulfoxide, acetone, anisole, acetic acid, butyl methyl ether, ethyl ether, ethyl formate, formic acid, pentane, heptane, methylethyl ketone and methyl isobutyl ketone, and is preferably water (purified water) or ethyl alcohol because raw materials for food should be used. In this case, more preferably, the solvent is present in an amount of 20 to 80% by weight based on the total weight of the oral film.

Meanwhile, in the oral film of the present invention, the emulsifier (surfactant) is used to ensure the stability and uniformity of the constituents of the oral film, and may include at least one selected from the group consisting of cationic, anionic, nonionic, and amphoteric surfactants. For example, the emulsifier includes at least one substance selected from the group consisting of poloxamers, sodium lauryl sulfate, glycerin fatty acid ester, polyoxyethylene fatty acid ester, sucrose fatty acid ester, lecithin, polysorbate, sorbitan fatty acid ester, and sucrose fatty acid ester, but is not limited thereto. Preferably, the emulsifier includes at least one selected from polysorbate 80 (Tween 80) and MCT oil powder.

Meanwhile, in the oral film of the present invention, the filler functions to increase the density of the film, maintain the shape of the film, and reduce tackiness (adherence) between the films. The filler in the present invention serves to control stickiness and the disintegration rate of the oral film and the release rate of the drug containing the active ingredient. The filler, for example, includes at least one component selected from the group consisting of microcrystalline cellulose, cellulose polymers, microcrystalline cellulose sodium carboxymethyl cellulose, magnesium carbonate, calcium carbonate, limestone powder, silicate, clay, talc, titanium dioxide, and calcium phosphate, but is not limited thereto. Preferably, the filler includes at least one selected from cellulose polymer and magnesium carbonate, and is preferably present in an amount of 0.01 to 40% by weight based on the total weight of the oral film.

Meanwhile, in the oral film of the present invention, the plasticizer serves to impart bendability and flexibility to the film made of a polymer to thereby prevent the film from becoming brittle. The plasticizer, for example, includes at least one selected from the group consisting of glycerin fatty acid ester, sucrose fatty acid ester, lecithin, enzyme-treated lecithin, polysorbate, sorbitan fatty acid ester, sorbitol, maltitol, xylitol, glycerin, polyethylene glycol, propylene glycol, hydrogenated starch syrup, starch syrup, glycerin, triacetin, glycerol oleate, sucrose fatty acid ester and medium-chain fatty acids, but is not limited thereto. Preferably, the plasticizer includes at least one selected from the group consisting of glycerin and lecithin. In this case, more preferably, the plasticizer is present in an amount of 0.01 to 30% by weight based on the total weight of the film.

Meanwhile, the oral film of the present invention contains the sweetener to impart a taste that suits the flavor of the oral film or to further improve a taste-masking effect. The sweetener, for example, includes at least one selected from the group consisting of sugar, glucose, maltose, oligosaccharide, galactose, starch syrup, sorbitol, maltitol, invert sugar, xylitol, erythritol, hydrogenated starch syrup, mannitol, trehalose, aspartame, acesulfame salts, sucralose, saccharin salts, neo-thyme, thaumatin, thaumatin mixtures, cyclamate, *Siraitia grosvenorii* extracts, licorice extracts, stevioside, enzyme-treated stevioside, neohesperidin, monellin, and the like, but is not limited thereto. Preferably, the sweetener includes at least one selected from enzyme-treated stevia, sorbitol, a lemon concentrated powder, and a natural lemon flavor. In this case, more preferably, the sweetener is present in an amount of 0.1 to 40% by weight based on the total weight of the oral film.

Meanwhile, in the oral film of the present invention, the pH adjuster affects the viscosity of the support layer of the oral film and functions to regulate the taste and stability of the formulation. The pH adjuster preferably includes at least one selected from the group consisting of citric acid, tartaric acid, ascorbic acid, fumaric acid, malic acid, adipic acid, succinic acid, sodium dihydrogen phosphate (monosodium phosphate), disodium dihydrogen pyrophosphate (sodium acid pyrophosphate), (Anhydrous) citric acid, amino acid hydrochlorides, sodium sulfite, sodium bicarbonate, sodium carbonate, potassium bicarbonate, potassium carbonate, sodium sesquicarbonate, sodium glycine carbonate, L-lysine carbonate, arginine carbonate, amorphous calcium carbonate, and calcium carbonate, but is not limited thereto. The amount of the alkalizing agent that is used may be adjusted within a range suitable for setting the pH range described above. In the present invention, extensive efforts were made to find a pH range to avoid problems in which a film is not formed due to the use of an alkalizing agent or in which the desired viscosity is not obtained. The pH adjustor used herein was at least one selected from anhydrous citric acid, magnesium oxide, sodium hydroxide, and potassium carbonate. In a preferred embodiment, the magnesium oxide, sodium hydroxide and potassium carbonate were used at a ratio of 1:5:1 to 5:1:1.

Meanwhile, in the oral film of the present invention, the flavoring agent may be a natural fragrance, an artificial fragrance, or a mixture thereof, and is not limited thereto. The flavoring agent may be an extract from leaves, flowers, and fruits of a plant, or the like, or an oil of a plant. The natural fragrance of the flavoring agent includes, for example, at least one selected from the group consisting of safflower essential oil, castor essential oil, coconut essential oil, cottonseed essential oil, canola essential oil, *Clupea pallasii* oil, palm fruit essential oil, palm essential oil, peanut essential oil, soybean essential oil, rapeseed essential oil, flaxseed essential oil, rice bran essential oil, pine essential oil, sesame essential oil, sunflower seed essential oil, hydrogenated safflower essential oil, and red ginseng essential oil. The artificial fragrance, for example, includes at least one selected from the group consisting of artificial synthetic fruit fragrances such as lemon, orange, grape, lime and strawberry flavors, and vanilla, chocolate, coffee, cocoa, pine needles, ginseng, red ginseng, and citrus fragrances. In the present invention, the flavoring agent is preferably present in an amount of 0.1 to 5% by weight based on the total weight of the oral film.

Meanwhile, in the oral film of the present invention, the preservative includes at least one selected from the group consisting of hydrogen peroxide, sodium hypochlorite, calcium hypochlorite, bleaching powder, benzoic acid or a sodium salt thereof, sorbic acid or a sodium salt or potassium salt thereof, sodium dehydroacetate, and propionic acid or a calcium salt or sodium salt thereof, but is not limited thereto. In the present invention, the preservative is preferably present in an amount of 0.1 to 5% by weight based on the total weight of the oral film.

Meanwhile, in the oral film of the present invention, the oral mucosal adhesive film includes an adhesive (mucosa) layer in direct contact with the oral mucosa and a support (protective) layer to prevent elution and disintegration into other parts of the oral cavity or intestinal tract. The adhesive layer must be water-soluble, be adhesive and not disintegrate quickly, whereas the protective layer must be insoluble, not allow saliva to penetrate easily, and be digestible by digestive organs.

Meanwhile, preferably, the oral film of the present invention may be used to provide antioxidative activity, or anti-inflammatory activity and/or to improve liver function.

Meanwhile, in the oral film of the present invention, the oral disintegrating film is preferably prepared through three steps, namely preparing a crude solution, coating/drying, and cutting/pouching.

In the process of producing the oral disintegrating film, first, the step of preparing a crude solution includes preparing a crude solution (a viscous solution that is imparted with a specific viscosity by feeding all raw materials including main ingredients), which is a liquid to produce a film, and removing bubbles generated during the process. At this time, it is preferable to dissolve a liquid phase of raw materials in a water bath, preferably at 80 to 100° C. Unless a water bath is used, the crude solution is preferably prepared by dissolving the raw materials in a solvent at a temperature ranging from room temperature to 45° C. More preferably, the raw materials are fed in the order of the water-soluble polymer (film-forming agent), the active ingredient/emulsifier, the filler, the plasticizer, the sweetener, and the pH adjuster/color-masking agent. In addition, the crude solution of the present invention may be prepared using dispersion rather than dissolution. In this case, the stability (homogeneity) of the oral disintegrating film can be maintained and the additional time required for homogenization is shortened.

Meanwhile, in the process of producing the oral disintegrating film, the coating and drying include applying the bubble-free crude solution to a desired thickness onto a PET base liner and passing the PET base liner through a long drying channel to obtain a dried semi-finished product. Preferably, the crude solution was applied onto a polyethylene release paper to coat the paper with the crude solution to a thickness of 0.70 to 0.80 mm at a development rate of 9.0 mm/sec. In addition, in this process, drying should be performed in consideration of the type of solvent that is used, the amount of the solvent, the viscosity thereof, and the thickness of the film. In some cases, the melting point or stability of the drug should be considered. Silymarin, which is the main ingredient of the milk thistle extract used in the present invention, has a high melting point of 158° C., so an emulsifier must be used to dissolve the same. In the present invention, the crude solution having the increased glutathione content must be dissolved in order to produce an optimal film, thus taking a long time to dissolve the same. Therefore, in the present invention, it is preferable to dry the film paper in a drying oven set at 70 to 90° C. for about 1 to 2 hours.

Meanwhile, in the process of producing the oral disintegrating film, the semi-finished product obtained through the coating and drying is stored for a desired period before cutting (or slitting) and pouching so as to be aged to achieve moisture balance and smooth PET peeling.

Meanwhile, in the process of producing the oral disintegrating film, after the aging is completed, the result is cut (or slit) and pouched. Slitting is the process of unwinding the aged semi-finished product, and at the same time, cutting the product to a predetermined width and winding the product again to produce a predetermined number of rolls narrower than the parent aged semi-finished product. In the present invention, the resulting product is cut and pouched. In this process, the film is cut to the desired thickness and weight. The film used herein is a film that is not readily deformed. At this time, the semi-finished roll obtained by cutting (or slitting) is cut to a size of a single piece of film and primarily packaged with wrapping paper.

Meanwhile, in the oral film of the present invention, the oral mucosal adhesive film is preferably produced through six steps, namely, preparing a crude solution, development, drying, re-development, re-drying, and cutting.

Meanwhile, in the process of producing the oral mucosal adhesive film, first, the step of preparing a crude solution includes separately feeding raw materials for a crude solution for the mucosa (adhesive) layer and raw materials for a crude solution for the support (protective) layer, followed by mixing. At this time, it is preferable to dissolve a liquid of the raw materials in a water bath, preferably at 80 to 100° C. Unless a water bath is used, the crude solution is preferably prepared by dissolving the raw materials in a solvent at room temperature to 45° C. Preferably, the water-soluble polymer (film-forming agent) of the mucosa (adhesive) layer is dissolved, the active ingredient is added to the emulsifier and dissolved therein, and the water-soluble polymer (film-forming agent) of the support (protective) layer, active ingredient, filler, plasticizer, sweetener, and pH adjuster/color-masking agent are fed in this order, followed by mixing. In addition, the crude solution of the present invention may be prepared using dispersion rather than dissolution. In this case, the stability (homogeneity) of the oral disintegrating film can be maintained and the additional time required for homogenization is shortened.

Meanwhile, in the process of producing the oral mucosal adhesive film, the development and drying include applying the bubble-free crude solution to a desired thickness onto a PET base liner and passing the PET base liner through a long drying channel to obtain a dried semi-finished product. Preferably, the crude solution was applied onto a polyethylene release paper to coat the paper with the crude solution to a thickness of 0.35 to 0.40 mm at a development rate of 9.0 mm/sec. In addition, in this process, drying should be performed in consideration of the type of solvent that is used, the amount of the solvent, the viscosity thereof, and the thickness of the film. In some cases, the melting point or stability of the drug should be considered. In the present invention, it is preferable to partially dry the film paper in a drying oven set at 70 to 90° C. for about 20 to 40 minutes.

Meanwhile, in the process of producing the oral mucosal adhesive film, the re-development and re-drying include applying a mixed solution for forming an adhesive layer onto the partially dried support layer to a predetermined thickness at a constant rate and re-drying the solution to achieve a thickness of 0.70 to 0.80 mm at a development rate of 5.0 mm/sec. In addition, in this process, re-drying should be performed in consideration of the type of solvent that is used, the amount of the solvent, the viscosity thereof, and the thickness of the film. In some cases, the melting point or stability of the drug should be considered. In the present invention, it is preferable to dry the film paper in a drying oven set at 70 to 90° C. for about 1 to 4 hours (preferably 1 to 2 hours).

Meanwhile, in the process of producing the oral disintegrating film, the product is preferably aged at a relative humidity of 30 to 90% for about 1 to about 30 days, before the cutting (or slitting) and pouching. As a result, the product contains an appropriate amount of water for cutting (or slitting), preferably 30% or less.

Meanwhile, in the process of producing the oral mucosal adhesive film, the cutting process is performed using a cutting molding machine in consideration of the thickness and weight of the produced film. At this time, a film that does not crack or deform during the cutting process is selected for cutting. Then, the film is packaged.

Meanwhile, jelly is a food obtained by coagulating a mixture of a semi-solidifying agent (gum-forming agent) such as pectin, gelatin, agar, starch, and alginic acid, with sugar, acidulant, and fruit juice, to an extent to impart sufficient hardness to maintain a soft shape. Jelly is mainly used as a snack or dessert after a meal because it tastes sweet due to the sugar content, and is attractive to all ages due to the soft texture thereof and easy-to-chew and easy-to-swallow properties. Accordingly, in the present invention, functional jelly is developed using a combination of glutathione with a milk thistle extract. In particular, stick jelly is developed.

Meanwhile, the stick jelly of the present invention preferably further contains vitamin C, a fruit concentrate, or the like as an additional active ingredient.

Meanwhile, the texture of the jelly is affected by the type of gelling agent. The jelly is dissolved at the temperature at which the gelling agent is dissolved or higher, and then other ingredients are mixed and dissolved while that temperature is maintained, followed by concentration to obtain the desired sugar content. This process determines the texture and formulation stability. Therefore, in the present invention, any gelling agent may be used without limitation, but is preferably a combination of xanthan gum, locust bean gum, agar, and carrageenan at an optimum mix ratio, as a vegetable natural gelling agent. Agar does not form a gel well when hydrolyzed by organic acids found in fruit juice, whereas locust bean gum and xanthan gum, which are not sensitive to pH, are used to ensure stability enabling the gel to be well formed. In addition thereto, the active ingredients glutathione and the milk thistle extract (silymarin) are mixed at an optimal mixing ratio, so stick jelly having excellent product stability and sensibility can be produced.

Meanwhile, any one may be used as the stick jelly of the present invention without limitation so long as it is a water-soluble polymer known in the art. The stick jelly preferably includes at least water-soluble polymer selected from hyaluronic acid, fish gelatin, elastin, modified potato starch, β-cyclodextrin (β-CD), sodium alginate, xanthan gum, locust bean gum, agar, and carrageenan.

Meanwhile, the stick jelly of the present invention may be used to provide antioxidant activity, to provide anti-inflammatory activity, or to improve liver function.

Meanwhile, the stick jelly of the present invention is obtained using any production method known in the art, but is preferably produced using the following process. First, purified water is heated to 70 to 80° C., mixed with a sugar-gelling agent composition, and heated to prepare a concentrate.

At this time, the concentrate is preferably heated at 85 to 90° C. for about 5 to 10 minutes until it thickens somewhat. In addition, a water-soluble polymer (film-forming agent) is preferably added to the concentrate, and then the resulting mixture is sequentially mixed with other active ingredients such as a plasticizer, sweetener, and pH adjuster. Then, the concentrated mixture is cooled and packaged to complete the stick jelly.

Meanwhile, through the following experiment, it was ascertained that an excellent film formulation having superior film strength and a homogeneous surface was produced by increasing the glutathione content and determining the optimal ratio of HPMC, pullulan, potato modified starch, and β-cyclodextrin (β-CD). In addition, it was ascertained that the oral disintegrating film of the present invention has excellent oral permeability and remarkably high bioavailability of glutathione. In addition, it was ascertained that the oral disintegrating film, the oral mucosal adhesive film, and the stick jelly of the present invention have excellent antioxidant activity and superior anti-inflammatory activity through regulation of expression of anti-inflammatory factors, and are capable of greatly improving liver function. Therefore, the present invention selects glutathione, which is a potent antioxidant, and silymarin, which helps improve liver function, as active ingredients, and produces an oral film and stick jelly having various efficacies of improving antioxidant activity and anti-inflammatory activity, strengthening immunity, and enhancing liver function, thereby providing a composition that exerts excellent functionality for humans and companion animals in the food industry.

Hereinafter, the present invention will be described in more detail with reference to the following examples and experimental examples, but the scope of the present invention is not limited to the examples and experimental examples, and includes variations of technical concepts equivalent thereto.

Example 1: Preparation and Evaluation of Oral Disintegrating Film Containing Glutathione In this embodiment, as shown in FIG. 2, an oral disintegrating film containing active ingredients such as glutathione and a milk thistle extract was produced under 6 types of conditions (1-1 to 1-6), and a comparative evaluation depending on the component composition thereof was performed. The glutathione used herein was a glutathione yeast extract (50% glutathione) obtained by extraction from yeast containing a great amount of glutathione (hereinafter referred to as "glutathione yeast extract (50%)", the same being applicable to the oral mucosal adhesive film and stick jelly). For this purpose, the film formation experiment was conducted through three steps of crude solution preparation using solvent development, coating and drying, and cutting and pouching, and the experimental procedure was as follows.

1) Crude Solution Preparation

Phase A was slowly added to a water bath (90° C.) and then was completely dissolved. The active ingredients of phase B and the emulsifier were separately stirred and dissolved in a water bath (90° C.), and phases D to G were added sequentially. That is, phases C to F were sequentially added to phase A+B. At this time, when phase F was added thereto, the viscosity increased.

2) Coating and Drying (Unfolding+Drying)

(1) Development: The mixed crude solution was developed by applying the same onto polyethylene release paper while a constant speed and a constant thickness were maintained. Film development was tested using a film spreader (KP-3000V model), and the thickness was 0.70 to 0.80 mm and the development speed was 9.0 mm/sec.

(2) Drying: drying should be performed depending on the type of solvent that is used, the amount of the solvent, the viscosity, and the thickness of the film. The silymarin in the milk thistle extract used in the present invention has a high melting point of 158° C., and an emulsifier must be used to dissolve the same. However, In the present invention, the crude solution having the increased glutathione content must be dissolved, thus taking a long time to dissolve the same. Therefore, the film paper was dried in a drying oven set at 80° C. for 1 to 2 hours.

3) Cutting and Pouching

The film was cut using a cutting molding machine depending on the thickness and the weight of the film. The case in which the film cracked or deformed during the cutting process was determined to indicate that a film was not formed, and the experimental conditions were continuously changed. A film that satisfied the requirements that no problem occurred during the cutting process and no deformation occurred was selected and cut. The film was cut to an appropriate size and charged in a small container or aluminum wrapper. The product in the small container or aluminum wrapper was packaged in a small box or is blister packaged to obtain an experimental sample, and the film was evaluated.

6 types of oral disintegrating films (Examples 1-1 to 1-6) were produced by solvent development. As a result, when each film-forming agent was used, films were not formed with PVA and PVP, a film produced using only HPMC was strongly adhered to release paper and remained undetached, and a film was formed with CMC-Ca, but had a non-uniform surface. When pullulan was used alone, the film did not retain the shape thereof for a long time due to the low strength and high adhesivity thereof. Therefore, when the strength and flexibility of the film were adjusted by controlling the ratio of HPMC and pullulan, a preferred oral disintegrating film (ODF) was obtained and selected.

Figure 3:
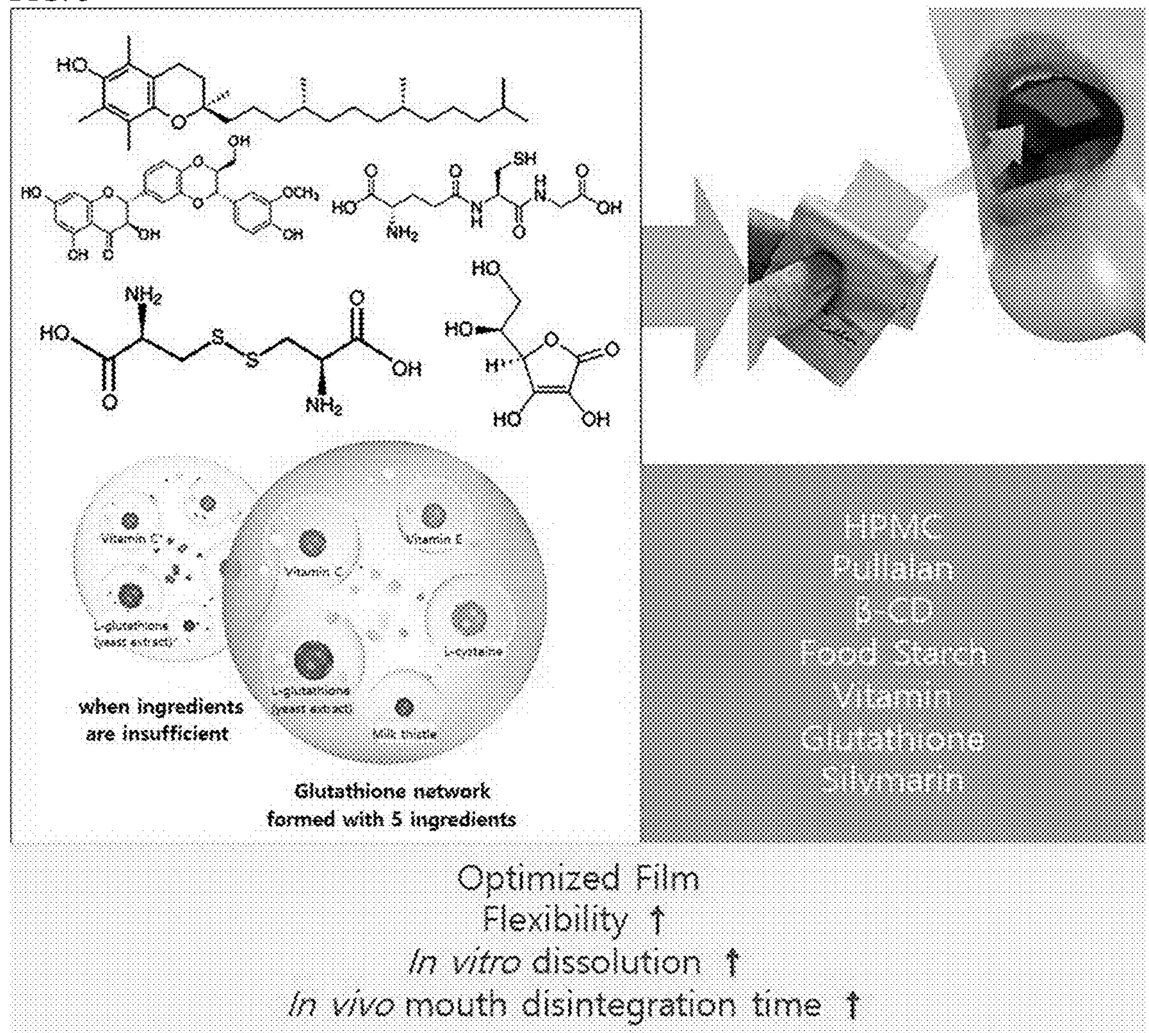
FIG. 3 is a schematic diagram illustrating ingredients and efficacies of the oral disintegrating film according to the present invention.

Accordingly, a film that was produced by increasing the glutathione content and controlling the content of HPMC, pullulan, modified potato starch, and β-cyclodextrin (β-CD) exhibited high film strength and a homogenous surface, thus providing the most desired formulation. For this reason, this film was selected, and corresponds to an oral disintegrating film that was determined to be the most suitable in Example 1-1. FIG. 3 is a schematic diagram illustrating efficacies of the produced oral disintegrating film.

Example 2: Preparation and Evaluation of Composition For Forming Oral Disintegrating Film According to Recommended Intake In this example, a composition for forming an oral disintegrating film was prepared and evaluated according to the recommended intake.

A film was produced in accordance with the proportions shown in Table 1 below based on the average {(maximum+minimum)/2} within the recommended daily intake of ingredients of the composition for forming the oral dissolvable film (glutathione: 200 to 500 mg, milk thistle: 320 mg/g or more (silymarin 130 mg), vitamin C: 30 to 1,000 mg, L-cysteine: 500 to 1,000 mg, and vitamin E: 3.3 to 400 mg) (applied to most additives). The raw materials for the mixture and other additives in Table 1 were, for example, ingredients other than the active ingredients of FIG. 2. The ingredients set forth in Table 1 below were mixed in purified water as a solvent using a homogenizer. The mixed crude solution was uniformly applied to a thickness of 1.5 mm and then dried at 80° C. The appropriate viscosity of the crude solution was 1,500 to 30,000 cPs, preferably 10,000 to 20,000 cPS, and the appropriate moisture content of the dried film was 10.0% based on the water content.

TABLE 1

| Additive | Addition rate | Content |
|---|---|---|
| Glutathione yeast extract (50%) | 350 | 11.67% |
| Milk thistle extract (silymarin) | 520 | 17.33% |
| Vitamin C | 130 | 4.33% |
| L-cysteine hydrochloride | 750 | 25.00% |
| Vitamin E | 200 | 6.67% |
| Raw materials for mixture and other additives | 1050 | 35.00% |
| Total | 3000 | 100.00% |

Example 3: Preparation and Evaluation of Oral Mucosal Adhesive Film (Double-Layer Polymer Film) Containing Glutathione In this example, as shown in FIG. 4, an oral mucosal adhesive film including a support (protective) layer and a mucosa (adhesive) layer was produced under 6 types of conditions (Examples 3-1 to 3-6) and comparative evaluation was performed. For this purpose, the film formation experiment was conducted through four steps, namely crude solution preparation using solvent development, coating/drying (development+drying), re-development/re-drying, and cutting/pouching. A film product was obtained through six steps, namely mixing, developing, drying, re-developing, re-drying, and cutting. A detailed description of each of the six steps is as follows.

1) Mixing

A water-soluble polymer of phase B (film-forming agent) was slowly added to a water bath (80° C.) and then completely dissolved. Silymarin, which is the active ingredient of the milk thistle extract, has low solubility in water and thus low bioavailability (23-47%) when administered orally, so dispersion stability was improved using an emulsifier such as polysorbate 80 (Tween80) in order to increase the solubility of silymarin. The active ingredient of phase A was separately stirred, dissolved in a phase B emulsifier, and dissolved in a water bath at 90° C. (preparation of support layer). A water-soluble polymer (film-forming agent) of phase C was slowly added to a water bath (90° C.) and then completely dissolved therein. Phases D to G were added thereto sequentially. At this time, when phase H was added, the viscosity increased (preparation of adhesive layer).

However, rather than using only an emulsifier, the content of the active ingredient glutathione (glutathione yeast extract (50%)) was increased and the content of HPMC, β-cyclodextrin (β-CD), pullulan, and modified potato starch was adjusted, so a film product having a flexible strength and a homogeneous surface was obtained (Example 3-1).

2) Development

In order to develop the mixed solution for the support layer, first, the mixed solution was applied onto polyethylene release paper to a predetermined thickness at a constant speed. The film development was tested using a film spreader (KP-3000V model), and the thickness was 0.35 to 0.40 mm and the development speed was 9.0 mm/sec.

3) Drying

Drying should be performed depending on the type of solvent that is used, the amount of the solvent, the viscosity thereof, and the thickness of the film. In some cases, the melting point or stability of the drug should be considered. Film paper was partially dried in a drying oven set at 80° C. for 20 to 40 minutes.

4) Re-Development

The mixed solution for the adhesion layer was applied to a predetermined thickness onto the partially dried support layer at a constant speed. Film development was tested using a film spreader (KP-3000V model), and the thickness was 0.7 to 0.80 mm and the development speed was 5.0 mm/sec.

5) Re-Drying

Re-drying should be performed depending on the type of solvent that was used for the support layer and the adhesive layer, the amount of the solvent, the viscosity, and the thickness of the film. In some cases, the melting point or stability of the drug should be considered. Film paper was partially dried in a drying oven set at 80° C. for 1 to 2 hours.

6) Cutting

The film was cut using a cutting molding machine depending on the thickness and weight of the film. The case in which the film cracked or deformed during the cutting process was determined to indicate that a film was not formed, and the experimental conditions were continuously changed. A film that satisfied the requirements that no problem occurred during the cutting process and that no deformation occurred was selected and cut.

6 types of oral disintegrating films (Examples 3-1 to 3-6) were produced by solvent development. As a result, when each film-forming agent was used, films were not formed with PVA and PVP, a film produced using only HPMC was strongly adhered to release paper, and remained undetached, and a film was formed with CMC-Ca, but had a non-uniform surface. When pullulan was used alone, the film did not retain the shape thereof for a long time due to the low strength and high adhesivity thereof.

In addition, when the content of glutathione was increased and the content of each of HPMC, β-cyclodextrin (β-CD), pullulan, and modified potato starch was adjusted, compared to when an emulsifier was used, a film product having a flexible strength and a homogeneous surface was obtained. An oral disintegrating film of the formulation of Example 3-1 was determined to be the most suitable. FIG. 5 is a schematic diagram illustrating the structure of the produced oral disintegrating film and the position of the oral mucosa at which the oral disintegrating film is adhered.

Example 4: Preparation and Evaluation of Stick Jelly Containing Glutathione

In this example, stick jelly containing glutathione was prepared and evaluated.

Edible jelly is jelly that melts in the mouth based on the body temperature and the chewing activity in the presence of saliva during a chewing process, and contains a mixture of a gelling agent (gelatin, agar, pectin, and the like) hydrated in water, such as thickened polysaccharide or high-molecular protein, an acidulant, a concentrate, and a flavoring agent. The type of gelling agent affects the texture of the jelly, and the mixing ratio of sugars directly affects the properties, molding ability and productivity of the jelly.

Jelly formulations are prepared by performing dissolution at or above the dissolution temperature of the gelling agent, mixing the result with other ingredients to be dissolved while maintaining the temperature, and adjusting the sugar content through a concentration process. This process determines the texture and formulation stability. For this reason, it is necessary to pay special attention to raw materials vulnerable to being denatured upon exposure to high temperature.

Therefore, according to the present invention, the mix ratio of xanthan gum, locust bean gum, agar and carrageenan was optimized, a stick jelly containing glutathione, a milk thistle extract (silymarin), a vitamin extract and the like was produced, and an experiment was performed at the optimal mix ratio. The most suitable ingredient ratio was determined by sensory evaluation in terms of product stability, taste, and odor. The detailed composition is shown in FIG. 6, and the process of preparing the stick jelly of the present invention was as follows.

1) Preparation of Raw Materials for Producing Stick Jelly

As shown in FIG. 6, raw materials for producing stick jelly were prepared. FIG. 6 illustrates an example of preparation of a stick jelly containing a glutathione extract, vitamin C, and a milk thistle extract (silymarin).

2) Heating Purified Water to 70 to 80° C.

The sugar was not dissolved in purified water in advance, and only purified water was weighed and heated, preferably heated to 80° C. to secure conditions for adding the sugar-gelling agent composition.

3) Preparing Sugar-Gelling Agent Composition

Unless the gelling agent is first mixed with the oligosaccharide, it is difficult to disperse the gelling agent because the gelling agent has increased strength but is increasingly vulnerable to acid as the sugar content increases. When gelatin is used, it is sensitive to external temperature to an extent that the product should be stored in the refrigerator, and locust bean gum, xanthan gum, and agar, which are natural vegetable gelling agents, were selected in order to appeal to consumers who are reluctant to consume animal ingredients. Agar does not form a gel due to hydrolysis by an organic acid of fruit juice, so jelly was formed using food gel NS-K raw materials, which were stabilized using locust bean gum and xanthan gum, which are not sensitive to pH.

4) Mixing Sugar-Gelling Agent Composition With Purified Water at 80° C., Followed by Heating The sugar-gelling agent composition, the active ingredient of phase A, and the emulsifier were mixed with purified water heated to 80° C., followed by heating to 85 to 90° C. until the mixture thickened slightly, preferably heating to 85° C., and then concentrating for 5 to 10 minutes, to prepare a concentrate.

5) Mixing With Water-Soluble Polymer (Film-Forming Agent)

A water-soluble polymer (film-forming agent) of phase B was dissolved while the temperature of the concentrate was maintained at 85° C., and was selectively fed and mixed.

6) Additionally Mixing Active Ingredient, Plasticizer, and Sweetener

Hydrous citric acid, vitamin C, trisodium citrate, potassium lactate, and enzyme-treated stevia were weighed and optionally further added. Functional ingredients and a sweetener were further added and heated to 95 to 98° C. to concentrate the same for 5 to 10 minutes. When the temperature reached 98° C., a natural fragrance was added. Then, the mixture was mixed for 15 to 20 minutes while the temperature was maintained.

7) Packaging

The heated concentrate was dispensed into a mold, cooled, and packaged to complete a stick jelly. Most preferably, the stick jelly of the formulation of Example 4-1, was used among the completed types of stick jelly.

Experimental Example 1: Oral Tissue Permeability Test Using Oral Film of Present Invention In this experimental example, oral tissue permeability using the oral disintegrating film in Example 1-1 was tested.

In general, the amount of saliva secreted daily is 1,500 mL, and the amount of saliva secreted upon stimulation is 10 to 250 mL/h. In order to determine the degree of absorption between 10 and 30 minutes, 3 g of the produced film was dissolved in 10 mL of artificial saliva (KCL 20 mM, KSCN 5.3 mM, $NaH_2PO_4$ 1.4 mM, $NaHCO_3$ 15 mM, $C_3H6O_3$ 10 mM) at 37° C. Human oral tissue has an average area of 200 $cm^2$, and 25 μL of the prepared crude solution was applied to human oral epithelial tissue (SkinEthic™ HOE, 0.5 $cm^2$).

After 10 minutes (T1), 20 minutes (T2), and 30 minutes (T3), the glutathione that penetrated the tissue and the glutathione remaining in the tissue were analyzed by HPLC (C18 column Zorbax ODS column 250 mm, 4.6 mm, 5 mm). Artificial saliva was repeatedly applied to the glutathione remaining in the tissue, a sufficient time was allowed to pass, and then analysis was performed thereon.

TABLE 2

| | Applied amount: 0.875 | | | | | | | |
|---|---|---|---|---|---|---|---|---|
| | Glutathione (mg) | | | | | Glutathione (%) | | |
| | F01 | F02 | F03 | Mean | Standard deviation | Percentage | Accumulated percentage | Standard deviation |
| T10 (medium) | 0.424 | 0.432 | 0.419 | 0.425 | 0.0054 | 48.57% | 48.57% | 0.75% |
| T20 (medium) | 0.153 | 0.162 | 0.146 | 0.154 | 0.0065 | 17.56% | 66.13% | 0.92% |
| T30 (medium) | 0.031 | 0.027 | 0.037 | 0.032 | 0.0041 | 3.62% | 69.75% | 0.58% |
| Tissue | 0.006 | 0.008 | 0.007 | 0.007 | 0.0008 | 0.80% | 0.80% | 0.11% |
| Total absorption | 0.614 | 0.629 | 0.609 | 0.617 | 0.0168 | 70.55% | 70.55% | 1.19% |

Figure 7:
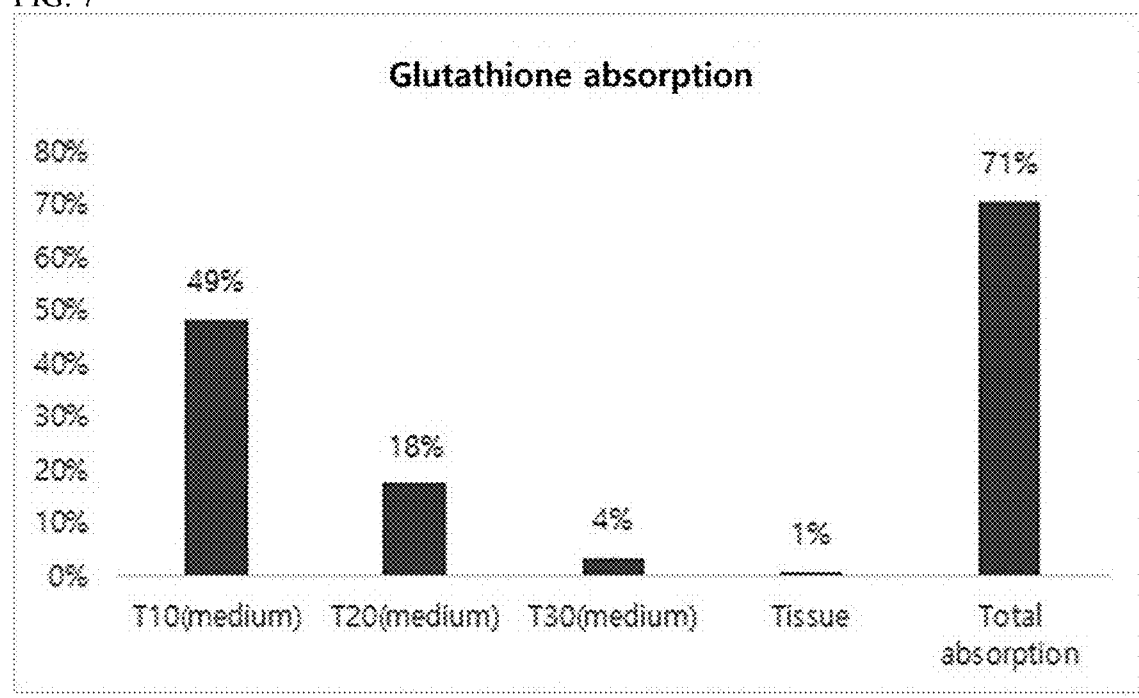
FIG. 7 is a graph showing the results of testing the oral tissue permeability of the oral disintegrating film of the present invention.

As a result, as can be seen from Table 2 and FIG. 7, glutathione permeated into the oral tissue, and an average of 0.617 mg (70.55%) of glutathione permeated in 30 minutes.

Experimental Example 2: Anti-Inflammatory Evaluation of Oral Film of Present Invention In this experimental example, the anti-inflammatory activity of the oral film in Example 1-1 was evaluated.

The inflammatory response, which is a type of immune response, is a defense mechanism of the human body upon receiving a harmful stimulus by microorganisms or compounds, and encompasses all processes from the removal of the stimulus to the restoration of the damaged tissue. It is reported that a chronic inflammatory response causes excessive secretion of inflammatory mediators to mediate various pathological mechanisms, such as promotion of the growth of cancer cells or exacerbation of arteriosclerosis due to increased insulin resistance.

In the immune system, macrophages regulate inflammatory response and immune function, and play a key role in maintaining homeostasis. The activity of macrophages is increased by stimulation with an LPS (lipopolysaccharide), which is a complex of lipids and polysaccharides covalently bound to an external antigen, and is an endotoxin mainly present as an outer membrane component of gram-negative bacteria.

Macrophages activated by stimulation facilitate secretion of proinflammatory cytokines such as TNF-α (tumor necrosis factor-α), IL (interleukin)-1β, and IL-6. When these inflammatory mediators are formed, arachidonic acid is involved in conversion into leukotriene, thromboxane, prostaglandin, and the like through the action of cyclooxygenase (COX) and mass production of NO (nitric oxide), thereby playing a pivotal role in mediating inflammation and causing fatal damage to the host. Production of proinflammatory cytokines such as TNF-α, IL-1β, and IL-6 is mediated by mitogen-activated protein kinases (MARKs) such as extracellular signal-regulated kinase ½ (ERK1/2), p38 (p38 kinases), and c-Jun NH2-terminal kinase (JNK), and NF-κ (nuclear factor kappa B). When macrophages are exposed to LPS stimulation, MAPKs and NF-κ are activated to induce the production of various inflammatory factors.

Figure 8:
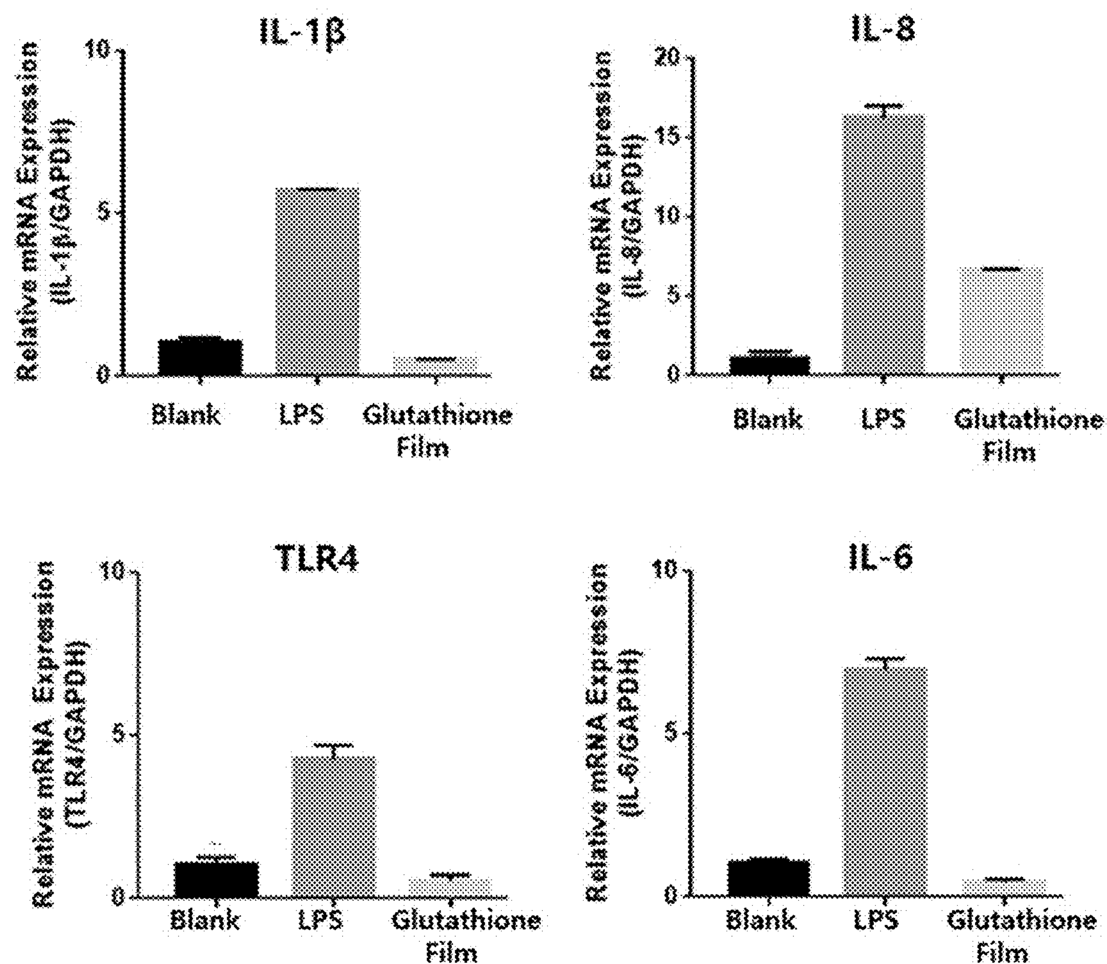
FIG. 8 is a graph showing the results of evaluating the anti-inflammatory activity of the oral disintegrating film of the present invention.

Therefore, in order to evaluate the anti-inflammatory activity, the expression of factors relating to the inflammatory response was identified. First, Raw 264.7 cells were seeded at a final concentration of $2\times10^5$ cells/well in a 96-well plate. The cells were incubated at 37° C. in a 5% $CO_2$ incubator for 24 hours and then treated with 50 μg/mL of each of the films according to the present invention. Then, 2 hours later, the cells were treated with 1 μg/ml of LPS to induce inflammation and incubated for 18 hours. Each test was performed in accordance with the test method recommended by the manufacturer. The result showed that the film of the present invention lowered the levels of inflammatory cytokines IL-1β, IL-8, TLR4 and IL-6, as shown in FIG. 8.

Experimental Example 3: Analysis of Bioavailability of Oral Disintegrating Film of Present Invention In this experimental example, the bioavailability of the oral disintegrating film of Example 1-1 was analyzed.

Six SD rats weighing 200 to 250 g were divided into three groups. A placebo oral film was attached to two rats (group A). A dissolved glutathione film composition was administered to the esophagus of two rats (group B). A glutathione film was attached to the oral cavity of two rats (group C). The dose of glutathione was 50 mg/1 kg (SD rat), and during the film test, the rats were anesthetized for 3 minutes after attachment for condition control. Venous blood was collected from each rat 3 times (after 0 min (basal), 30 min (T30), and 60 min (T60)), followed by treatment with DTT (DL-dithiothreitol) and analysis by HPLC.

Figure 9:
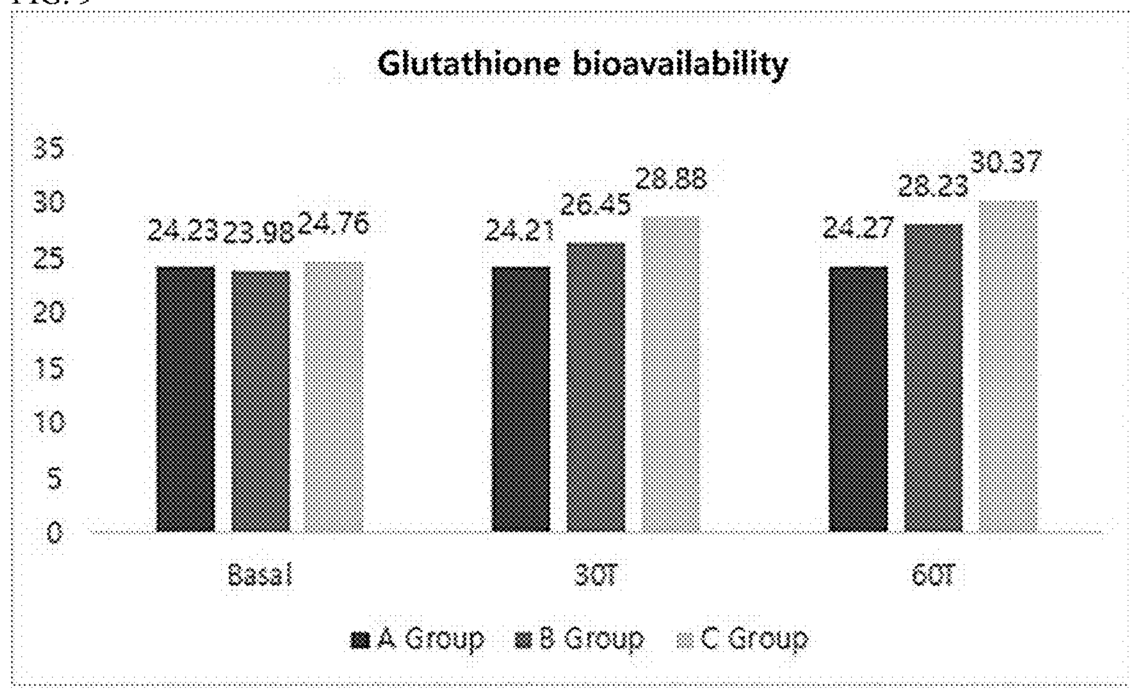
FIG. 9 is a graph showing the results of confirming the bioavailability of glutathione of the oral disintegrating film of the present invention.

As can be seen from Table 3 and FIG. 9 below, group C, in which the glutathione film was attached to the oral cavity, exhibited remarkably high glutathione bioavailability, and the result of analysis of the concentration of glutathione in the blood analyzed 0 minutes, 30 minutes, and 60 minutes after ingestion showed that the concentration of glutathione was higher at 60 minutes than at 0 minutes.

TABLE 3

| | Basal | 30T | 60T |
|---|---|---|---|
| A Group (nmol/mg protein) | 24.23 | 24.21 | 24.27 |
| B Group (nmol/mg protein) | 23.98 | 26.45 | 28.23 |
| C Group (nmol/mg protein) | 24.76 | 28.88 | 30.37 |

Experimental Example 4: Evaluation of Antioxidative Activity and Anti-Inflammatory Activity of Oral Disintegrating Film of Present Invention, Oral Mucosal Adhesive Film, and Stick Jelly In this experimental example, the antioxidative activity and anti-inflammatory activity of the oral disintegrating film, the oral mucosal adhesive film, and the stick jelly produced in Examples 1 to 4 were evaluated, and the most preferred formulations were used in the experiment.

1) Evaluation of Antioxidant Activity (DPPH-Free Radical Scavenging)

1% of the oral disintegrating film (Example 1-1), the oral mucosal adhesive film (Example 3-1), and the stick jelly (Example 4-1) were homogeneously dissolved, and centrifuged at 10,000 rpm and at 4° C. for 5 minutes to prepare a CFE (cell-free extract).

3.0 mL of a 2,2-diphenyl-2-picryl hydrazyl hydrate (DPPH) solution (5 mg/100 mL ethanol) was mixed with 500 μL of the prepared CFE, and the same amount of ethanol, MRS solution, and ascorbic acid (100 μg/mL) were used as a control group, a blank, and a comparative group, respectively. Then, the result was mixed with the DPPH solution and incubated in a dark room for 30 minutes, absorbance at 517 nm was measured, and the antioxidant activity was converted into % using Equation 1 below.

[Equation 1]

$$DPPH \text{ free radical scavenging (\%)} = \frac{\text{(Absorbance of control)} - \text{(Absorbance of sample)}}{\text{(Absorbance of control)}} \times 100$$

TABLE 4

| Acid tolerance (relative to 0 h %) | Oral disintegrating film | Oral mucosal adhesive film | Stick jelly | DPPH-free radical scavenging (%) |
|---|---|---|---|---|
| 90 | 107 | 110 | 103 | 90 |

As a result, as can be seen from Table 4, the oral disintegrating film, the oral mucosal adhesive film, and the stick jelly containing glutathione according to the present invention had antioxidant activity superior to that (90%) of the positive control group.

2) Antiinflammatory Activity Evaluation

Inflammatory derivatives such as NO, iNOS, COX-2, IL-1β and IL-6 are excessively produced through the NF-κB signaling pathway. NF-κB is one of the most important transcription factors involved in inflammatory mechanisms in immune cells. Abnormal NF-κB activity due to various causes has been known to be involved in the mechanism of various autoimmune diseases such as atopy, allergies, and arthritis. Therefore, in order to evaluate the effect of the present invention on NF-κB signaling activation, LPS was induced in HT-29 cells, the expression of factors relating to the inflammatory response was observed, and an experiment was performed in accordance with the following method.

The film was artificially treated with LPS, which is an inflammatory inducer, and whether or not the film had anti-inflammatory activity was determined. The oral disintegrating film (Example 1-1), the oral mucosal adhesive film (Example 3-1), and the stick jelly (Example 4-1) were each dissolved in an amount of 1 g/1 ml at 10,000 rpm and 4° C. for 5 minutes to prepare a CFE (cell-free extract). The cells were at $2\times10^5$ cells/well in a 96-well plate and incubated at 37° C. and 5% $CO_2$ in an incubator for 24 hours. The cells were allowed to stand overnight, the medium was exchanged with fresh medium, and LPS (1 ug/ml) and extracts were added at predetermined concentrations thereto, followed by incubation for 24 hours. After incubation, the medium supernatant was collected and reacted with Griess reagent at a ratio of 1:1, and absorbance at 570 nm was measured.

The HT-29 cell line used in this experiment was acquired from Korea culture type collection (KCTC, Korea) and incubated in an RPMI 1640 medium (Gibco BRL, USA) supplemented with 10% heat-inactivated fetal bovine serum (FBS, Gibco), penicillin G (100 IU/ml), and streptomycin (100 mg/ml) in an atmospheric environment at 37° C. and 5% $CO_2$.

HT-29 cells were seeded in a 96-well plate at a density of $1\times10^5$ cells/well, incubated for 24 hours, and then pre-treated with the heat-treated strains for 24 hours. The corresponding medium was removed and the residue was treated with lipopolysaccharide (LPS) (1 μg/mL) to induce an inflammatory response, followed by allowing the reaction to proceed for 24 hours. At this time, the groups were divided into a positive control group, a negative control group, and a strain treatment group. The positive control group was blank, the negative control group was treated only with LPS, and the strain treatment group was treated with LPS. For RNA extraction and cDNA synthesis, the media in the LPS-treated plate well was suctioned and treated with 1 mL of Trizol reagent (Invitrogen). Then, the cells were completely removed using a cell scraper, and 200 μL of chloroform was added thereto, followed by stirring, incubation for 5 minutes, and centrifugation at 12,000 rpm and at 4° C. for 15 minutes. The resulting supernatant was dispensed into an ep tube and 200 μL of isopropanol was added to the tube, followed by incubation for 10 minutes. After incubation, centrifugation was performed at 12,000 rpm and at 4° C. for 15 minutes, and the supernatant was removed. At this time, the pellet in the tube was washed with 75% EtOH, and centrifugation was performed at 7,500 rpm and at 4° C. for 5 minutes to remove the supernatant. Then, the result was dried in air for 5 minutes, 20 μL of DEPC was dispensed, and the RNA concentration of nanodrops was measured. Based on the concentration, the RNA was diluted to 100 ng/μL and then cDNA was synthesized through PCR using a cDNA kit (Applied Biosystems). PCR was performed at 25° C. for 10 minutes, at 37° C. for 2 hours, and at 85° C. for 5 minutes.

The synthesized cDNA was diluted to 100 ng/μL, the genetic expression level of inflammatory cytokines was measured using qRT-PCR, and IL-1β, IL-8, TLR4, and IL-6 were measured as markers of the inflammatory response. The primer sequences used are shown in Table 5 below.

TABLE 5

| Genes | | Gene sequences | Tm (° C.) |
|---|---|---|---|
| GAPDH | F | 5'-CCT GCT TCA CCA CCT TCT-3' | 59.8 |
| | R | 5'-ATG ACC ACA GTC CAT GCC-3' | |
| IL-1β | F | 5'-CCA GCT ACG AAT CTC GGA CCA CC-3' | 63.0 |
| | R | 5'-TTA GGA AGA CAC AAA TTG CAT GGT GAA GTC AGT-3' | |
| IL-8 | F | 5'-GTT GTG AGG ACA TGT GGA AGC ACT-3' | 56.5 |
| | R | 5'-CAC AGC TGG CAA TGA CAA GAC TGG-3' | |
| TLR4 | F | 5'-CAG AAC TGC AGG TGC TGG-3' | 53.2 |
| | R | 5'-GTT CTC TAG AGA TGC TAG-3' | |
| IL-6 | F | 5'-CCG GAG AGG AGA CTT CAC AG-3' | 64.2 |
| | R | 5'-GGA AAT TGG GGT AGG AAG GA-3' | |

An average (%) of the expression levels of respective inflammatory cytokines was calculated using the following Equation 2, and the difference in expression level for each concentration and each type of cytokine was converted into a percentage concentration, and is shown in Table 6.

$$\text{Expressed inflammatory cytokine (\%)}=[1-(\text{Fold}_{sample}-\text{Fold}_{blank})/(\text{Fold}_{control}-\text{Fold}_{blank})\}\times 100 \quad \text{[Equation 2]}$$

TABLE 6

| | Oral disintegrating film | | Oral mucosal adhesive film | | Stick jelly | |
|---|---|---|---|---|---|---|
| Cytokine | Glutathione + milk thistle extract (silymarin) | Non-added | Glutathione + milk thistle extract (silymarin) | Non-added | Glutathione + milk thistle extract (silymarin) | Non-added |
| Blank | 3 | 2 | 3 | 4 | 4 | 4 |
| LPS (1 μg/ml) | 100 | 100 | 100 | 100 | 100 | 100 |
| IL-1β | 11 | 45 | 8 | 42 | 17 | 51 |
| IL-8 | 19 | 47 | 15 | 44 | 22 | 47 |
| TLR4 | 19 | 52 | 12 | 52 | 29 | 58 |
| IL-6 | 17 | 48 | 14 | 43 | 27 | 51 |

As a result, as can be seen from Table 6, the oral disintegrating film, the oral mucosal adhesive film, and the stick jelly containing glutathione according to the present invention had anti-inflammatory activity as well as excellent antioxidant activity.

Experimental Example 5: Evaluation of Liver Function Improvement Ability of Oral Disintegrating Film, Oral Mucosal Adhesive Film, and Stick Jelly of Present Invention In this experimental example, the ability of each of the oral disintegrating film, the oral mucosal adhesive film, and the stick jelly produced in Examples 1 to 4 to improve liver function was evaluated, and the most preferred formulations were used in the experiments.

In order to evaluate the efficacy of improving liver function, mRNA expression levels of collagen-α(I) and α-SMA (alpha-smooth muscle actin) were measured. DMEM medium was dispensed in a 6-well plate such that the concentration of LX2 cells, which is a human hepatic stellate cell line, was $2.5\times10^5$ cells/well, followed by incubation at 37° C. under 5% $CO_2$ for 48 hours. The cells were treated with the sample at each concentration, incubated for 3 hours, treated with 10 ng/ml of TGF-β1, and incubated for 24 hours. Then, total RNA was extracted from the resulting cells using the TRI sample, and cDNA was synthesized using the same as a template. The mRNA expression level was determined by reverse transcription PCR and real-time PCR analysis (A: blank, B: positive control, C: 10 ng TGF-β1+oral disintegrating film, D: 10 ng TGF-β1+oral mucosa adhesion film, E: 10 ng TGF-β1+stick jelly).

As a result, as can be seen from FIG. 10, the oral disintegrating film, oral mucosal adhesive film, and the stick jelly containing glutathione according to the present invention effectively suppressed the mRNA expression of collagen-α(I) and α-SMA (alpha-smooth muscle actin), which indicates that they are capable of greatly improving liver function.

The invention claimed is:

1. A method of providing anti-inflammatory activity to a subject in need thereof, the method comprising administering an oral film comprising a glutathione yeast extract containing 50 wt % glutathione, milk thistle extract, vitamin C, L-cysteine hydrochloride, vitamin E, purified water, modified potato starch, hydroxypropyl methylcellulose, β-cyclodextrin (β-CD), and pullulan to the subject.

2. The method according to claim 1, wherein the oral film is any one selected from an oral disintegrating film and an oral mucosal adhesive film.

* * * * *

SEQUENCE LISTING

<160> NUMBER OF SEQ ID NOS: 10

<210> SEQ ID NO 1
<211> LENGTH: 18
<212> TYPE: DNA
<213> ORGANISM: Homo sapiens

<400> SEQUENCE: 1
cctgcttcac caccttct 18

<210> SEQ ID NO 2
<211> LENGTH: 18
<212> TYPE: DNA
<213> ORGANISM: Homo sapiens

<400> SEQUENCE: 2
atgaccacag tccatgcc 18

<210> SEQ ID NO 3
<211> LENGTH: 23
<212> TYPE: DNA
<213> ORGANISM: Homo sapiens

<400> SEQUENCE: 3
ccagctacga atctcggacc acc 23

<210> SEQ ID NO 4
<211> LENGTH: 33
<212> TYPE: DNA
<213> ORGANISM: Homo sapiens

<400> SEQUENCE: 4
ttaggaagac acaaattgca tggtgaagtc agt 33

<210> SEQ ID NO 5
<211> LENGTH: 24
<212> TYPE: DNA
<213> ORGANISM: Homo sapiens

<400> SEQUENCE: 5
gttgtgagga catgtggaag cact 24

<210> SEQ ID NO 6
<211> LENGTH: 24
<212> TYPE: DNA
<213> ORGANISM: Homo sapiens

<400> SEQUENCE: 6
cacagctggc aatgacaaga ctgg 24

<210> SEQ ID NO 7
<211> LENGTH: 18
<212> TYPE: DNA
<213> ORGANISM: Homo sapiens

<400> SEQUENCE: 7
cagaactgca ggtgctgg 18

<210> SEQ ID NO 8
<211> LENGTH: 18
<212> TYPE: DNA
<213> ORGANISM: Homo sapiens

<400> SEQUENCE: 8

-continued

```
gttctctaga gatgctag                                                18


<210> SEQ ID NO 9
<211> LENGTH: 20
<212> TYPE: DNA
<213> ORGANISM: Homo sapiens

<400> SEQUENCE: 9

ccggagagga gacttcacag                                              20


<210> SEQ ID NO 10
<211> LENGTH: 20
<212> TYPE: DNA
<213> ORGANISM: Homo sapiens

<400> SEQUENCE: 10

ggaaattggg gtaggaagga                                              20
```